United States Patent [19]
Batch et al.

[11] Patent Number: 5,423,023
[45] Date of Patent: Jun. 6, 1995

[54] METHOD AND APPARATUS FOR PROVIDING A USER CONFIGURABLE SYSTEM WHICH INTEGRATES AND MANAGES A PLURALITY OF DIFFERENT TASK AND SOFTWARE TOOLS

[75] Inventors: James C. Batch, Newberg; Eileen M. Burns-Brookens, Tigard; Pavel Ivanov, Aloha; Timothy I. Michel, Portland; Robert A. Russell, Banks, all of Oreg.

[73] Assignee: Prime Computer, Inc., Bedford, Mass.

[21] Appl. No.: 543,048

[22] Filed: Jun. 25, 1990

[51] Int. Cl.⁶ .................... G06F 9/44; G06F 9/455
[52] U.S. Cl. .................... 395/500; 395/700; 364/DIG. 1; 364/232.3; 364/267.4; 364/274.6
[58] Field of Search .................... 395/500, 700

[56] References Cited

U.S. PATENT DOCUMENTS

| | | | |
|---|---|---|---|
| 4,559,614 | 12/1985 | Peek et al. | 395/500 |
| 4,656,603 | 4/1987 | Dunn | 395/2 |
| 4,791,558 | 12/1988 | Chaitin et al. | 395/500 |
| 4,858,114 | 8/1989 | Heath et al. | 395/775 |
| 4,859,995 | 8/1989 | Hansen et al. | 345/163 |
| 4,939,507 | 7/1990 | Beard et al. | 395/500 |
| 4,961,133 | 10/1991 | Talati et al. | 395/700 |
| 5,036,484 | 7/1991 | McCoy et al. | 395/500 |
| 5,097,533 | 3/1992 | Burger et al. | 395/500 |
| 5,101,491 | 3/1992 | Katzeff | 395/500 |
| 5,117,496 | 5/1992 | Stearns et al. | 395/700 |

Primary Examiner—Parshotam S. Lall
Assistant Examiner—Krisna Lim
Attorney, Agent, or Firm—Wolf, Greenfield & Sacks

[57] ABSTRACT

A user configurable system which integrates and manages a plurality of different tasks and software tools. It is adapted primarily for use in design and production automation systems. The system has a main control routine which utilizes macros to control each process to be performed, including the sequencing of tasks and the encapsulation of any incompatible software tools which interface with the control program. The encapsulation controls the interpretations for transfers between the incompatible tool and the control program. Additional routines are provided for providing interfacing between various tools, including tools having various types of incompatibilities, and between an operator and the system or the various tools used therein. All such routines are rules based and such rules, including the macros used with the control routine, are written in an interpretive extension language which is both human and machine readable. This renders the system easily configurable and reconfigurable by the user.

68 Claims, 27 Drawing Sheets

FIG.3A

Run a Design Rules Checker on an electronic schematic;
    if the Design Checker completes successfully,
    then call a Signal Netlist Extractor for a Digital Simulator;
        if the Extractor extracts correctly,
        then call the Digital Simulator.
            Run the Simulator using another Behavior Control Macro;
            Display the results in an Electronics Signal Wave Editor, and
            Highlight any errors in the electronics schematic design file;
        Else notify User of signal netlist extraction errors;
    Else notify User of electronics design rule violations;
Return to the Schematic Editor.

HEADER LABEL ——— (epic rules)

THESE ARE COMMENTS
```
# (c)1989 Prime Computer, Inc. as an unpublished work.
# All rights reserved. CVedc_Version 4.2.6
# This is the define of process section. Every tool
# you want to execute must be listed here or you can
# not run it.
```

THE DEFINE SECTION
```
DEFINE cadat
DEFINE cadatwe -window -nowrapper -Ws 600 200
DEFINE designchk -windowkeep
DEFINE epicview -nowrapper -master
```

THE INITIAL SETS ———
```
# here is the place for global SET's
SET ICONIC^(2t
```

THE EXECUTE SECTION — EXECUTE epicview

THE MACRO SECTION
```
# The macro section begins here
# _____
# This macro puts the user into a quickselect mode in
# schedit that will ask the user to pick a single node.
# It will then send this node to dv to translate it to
# the appropriate name and highlight it in wavedit.
# This is for cadat.
# The parameters are 1-designname 2-sim or sch
MACRO cadat_high_sch2we
SET hi_designname $1
SET hi type $ 2
IF $ schedit_up "YES"
   If $hi_type "sim"
      SEND schedit "$unselect;: select;: talk send dv find
cadat \\\ $designname $nodes \; send send wavedit:clear
highlight \; current \\\ $ simname \; highlight"
   ELSE
      SEND schedit "$unselect;: select;: talk send wavedit
:clearhighlight \; current $nodes \; highlight"
   ENDIF
ELSE
   SEND $FROM:echo Please go through epic to bring up
schedit on your design
ENDIF
ENDMACRO
```

```
MACRO PKGR
    SET pkgr_from $FROM
    SET pkgr_file $1
    SET pkgr_status "ok"
    IF $pkgr_file "$"
        SEND $pkgr_from: echo No design specified, pkgr was not run.
    ELSE
        SEND $pkgr_from: echo Calling pkgr
        WHILEXEC pkgr $pkgr_file
            IF $pO "error"
                SET pkgr_status "errors"
            ENDIF
            IF $pO "ERROR"
                SET pkgr status "errors"
            ENDIF
            IF $pO "warning"
                IF $pkgr_status "ok"
                    SET pkgr_status "warnings"
                ENDIF
            ENDIF
            IF $pO "WARNING"
                IF $pkgr_status "ok"
                    SET pkgr_status "warnings"
                ENDIF
            ENDIF
        ENDWHILE
        IF ERROR pkgr
            SEND $pkgr_from: echo pkgr exited with error status
        ELSE
            IF $pkgr_status "ok"
                KILL pkgr
                SEND $pkgr_from: echo pkgr finished O.K.
            ELSE
                SEND $pkgr_from: echo pkgr finished with $pkgr_status
            ENDIF
        ENDIF
    ENDIF
ENDMACRO
```

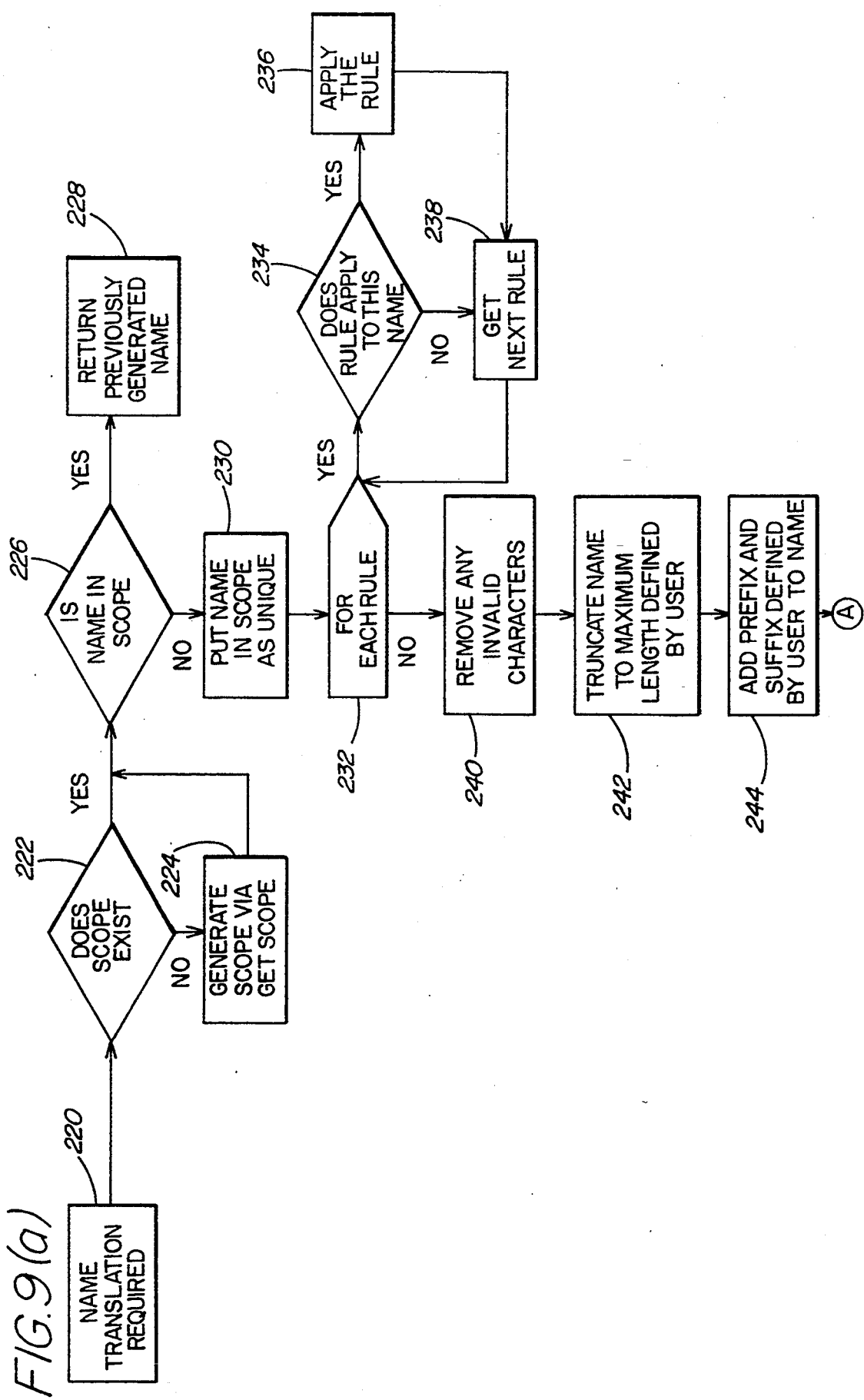

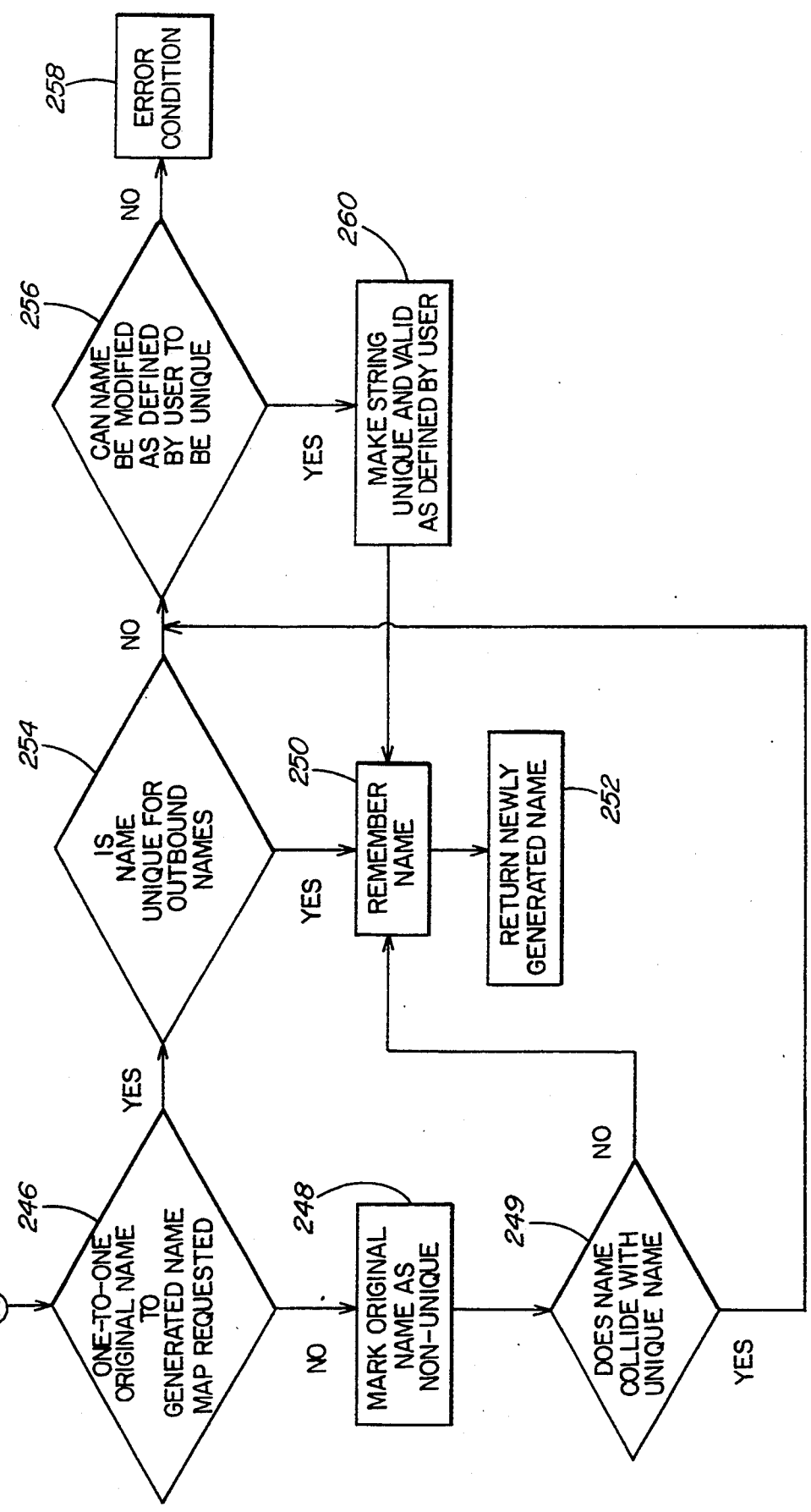

FIG. 12A

```
EXTRACTS
!   EXTRACT[1]
!   !   IDENTIFIER:= xilinx;
#  Now begin the schematic
!   !   START [schematic]
            FOR_ALL [nets]
              FOR_ALL [symbols]
                FPRINT:=[CONSOLE,"SYM,%s, %s ",name,primitive_name];
                FPRINT:=[CONSOLE,"\n"];
                FOR_ALL[ports]
                    SETVAR;=(newname,%s,port_node_name);
                    IF  [[newname,EQUALS,".*free"]]
                    CONTINUE;
                  ..FIN_IF [newname];
                  IF [[newname,EQUALS,"logical"]]
                      SETVAR:=(newname,%s,VDD);
                      SETVAR:=(log1set,%s,yes);
                  ..FIN_IF [newname];
                  FPRINT:=[CONSOLE,"PIN,%s,%s,",name,port_type];
                  FPRINT:=[CONSOLE,"%s",newname];
                  FPRINT:=[CONSOLE,"\n"];
              ..FIN_FOR_ALL[ports];
              FPRINT:=[CONSOLE,END \n"];
            ..FIN_FOR_ALL[symbols]
          ..FIN_FOR_ALL[nets]
          FPRINT:=[CONSOLE,"EOF\n"];
!   !@..FIN_START[schematic];
!   !..FIN_EXTRACT[1];
!.. FIN_EXTRACTS;
```

FIG.13A

VERTOOL
    cadat
SETLIST
    designname
    faultname
    simcaplist
    sch_or_sim sch
    schname
    simname
SIMTYPE good run 0
    SET DSL y
    SET GOOD y
    SET CFILE \sdesignname
    SET DFILE \sdesignname
    SET CLFILE/usr/cadat/lib/ssimsi/obj/ssimsi.lib
    SET SELOPT ALL
ADVANCED
    SET VWORK *
    SET GOUTNAM *
    SET SELFIL *
    SET NOMDEL *
    SET DOSWL *
    SET SHM$IM *
    SET CFGFILE *
    SET HWPORT *
    SET CHKPNT *
    SET CHKINT *
    SET GCONT *
    SET VERROR *
    SET VLP *
USRDEF
SIMTYPE worstcase run 0
    SET DSL y
    SET WCSIM y
    SET CFILE \sdesignname
    SET DFILE \sdesignname
    SET CLFILE/usr/cadat/lib/ssimsi/obj/ssimsi.lib
    SET SELOPT ALL
GRAPHTOOLS
    simgr,wavedit
EDITOOLS
    vi,wavedit
FULLSIM
    graph_output,simulate,edit_input,netlist

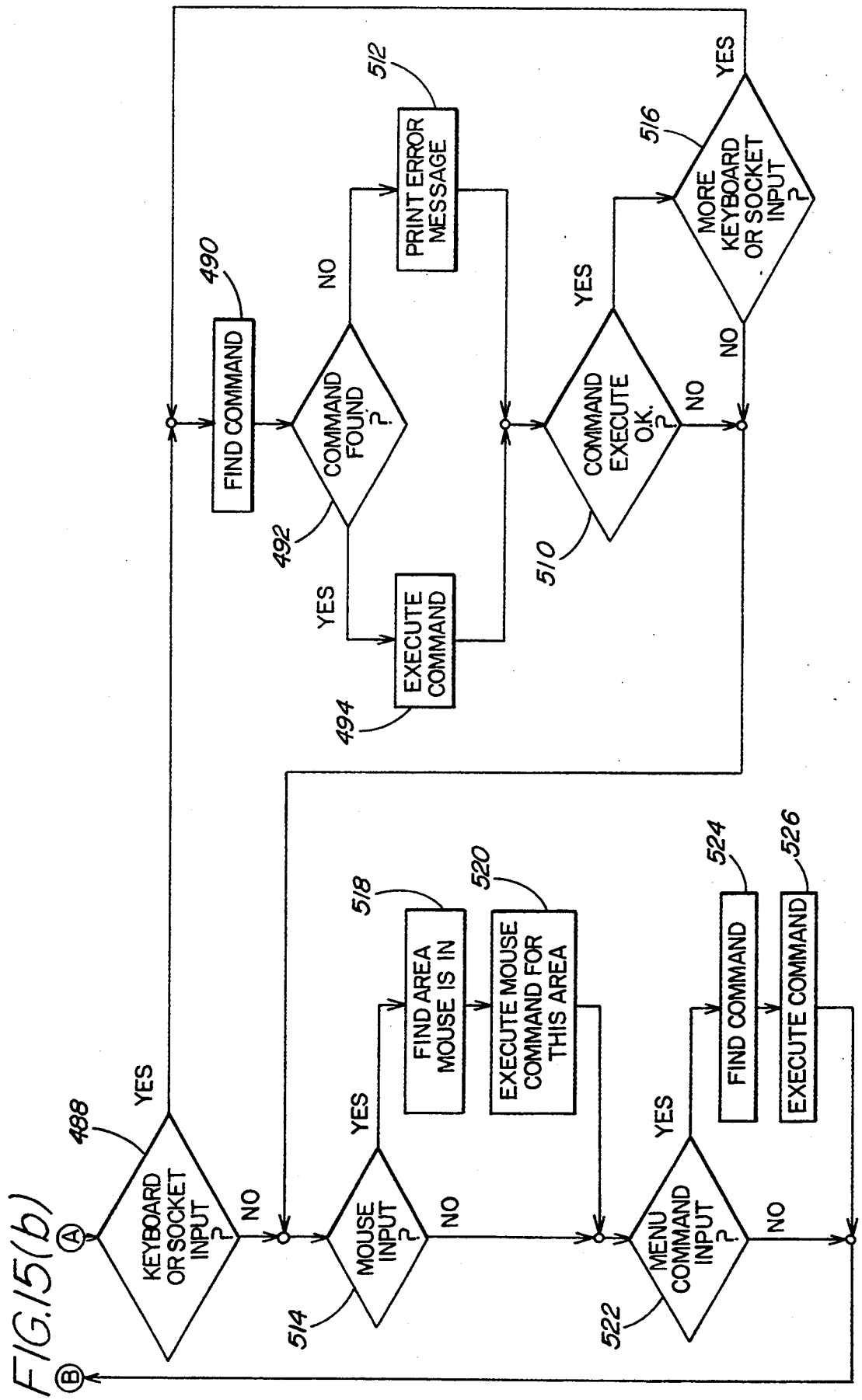

1

METHOD AND APPARATUS FOR PROVIDING A USER CONFIGURABLE SYSTEM WHICH INTEGRATES AND MANAGES A PLURALITY OF DIFFERENT TASK AND SOFTWARE TOOLS

FIELD OF THE INVENTION

This invention relates to design and production automation systems and more particularly to a method and apparatus for providing a user configurable system which integrates and manages a plurality of different software design and production tasks and tools, at least some of which tools may be incompatible with each other and with the system for integrating and managing.

BACKGROUND OF THE INVENTION

Computers are currently utilized in the design, production engineering, manufacture and testing of many products. Examples in the electronic field include integrated circuits, printed circuit boards, and products using such components including computers, home electronic products and the like. Similar procedures are utilized for products such as home appliances, cameras, automobiles, and the like. Thus, computer controlled automation of design, manufacture and testing can be utilized in any industry where multiple steps are involved in the creation and fabrication of an end product.

Typically, a number of different pieces of equipment may be utilized to perform the various design, manufacture and testing operations and the user may have either off-the-shelf or customized software packages or tools which it utilizes for performing the various functions. In many instances, the languages, legal character strings, formats, syntax and other factors employed in or used to communicate with the various software tools are not completely compatible.

Currently, the software tools used to capture, verify, and analyze the performance of a design during the design phase, to lay out the design during the manufacturing engineering stage, to perform the various manufacturing steps during the manufacturing stage, and to test the various components of the end product during the testing stage are separate procedures, employed sequentially, with the output from one tool or process providing the input to a subsequent process. The most common procedure for employing these sequential processes is to await the completion of one process and to drive a subsequent process with the output from the previous process through the use of a command sequence entered at a keyboard or other input of one or more components of the system. Thus, the user, through use of a terminal display and a keyboard or other input, determines the sequence of operations, and in many intances assures the proper transfer of necessary information from one process to the next.

This separate invocation of individual processes can become quite tedious to the user, and separate additional programs called translators are often required to properly transfer data outputs from one process to another because of various incompatibilities between the programs. The user must be able to communicate with the processes in standard operating system language and must have a clear understanding of how to control the input and output of the various processes.

This requires that all people utilizing the system be fully knowledgeable in the operation of the overall system and of each of the tools being utilized therein. This further requires that any time a change is made in one of the software tools, for example, to upgrade or improve it, or in the language or procedures being used by any component in the system, all potential users of the system must be made aware of the change and must understand it in order to prevent errors in operation and to assure optimum operation of the system.

In addition, with existing systems, even a knowledgeable and skilled operator requires substantial time to complete a task because of the number of separate sequential operations which are required, and the operator must work carefully to assure that the task is completed properly. Since the operator may have little guidance in performing operations, errors occur even with the most careful operator, and the systems do not provide a systematic way of detecting errors when they are entered so that such errors may pass through the system, from process to process, without detection, resulting in cumulative errors which, once ultimately detected, may be time-consuming and expensive to correct.

Further, when a user determines that a new software tool not previously employed in the system should be added, there is no systematic way for adding such tool. As a result, a new data translator may need to be designed, developed, tested and verified and other procedures may be required to interface such tool into the system, all of which require substantial expertise, time and expense to accomplish successfully.

In particular, in existing systems, the software is generally provided only in object code form and a user may not be able to make modifications, or may do so only in source code which must be compiled in a separate operation, generally outside the system, before being usable by the system. It would be preferable if the user could control the system with code written in an interpretive extension language which is both machine and human readable.

A need, therefore, exists for an improved method and apparatus (sometimes collectively referred to as "system") for use with a plurality of different software design and production tools which substantially simplifies the use of such system for the end user, requiring the end user to have far less knowledge of the system and the software tools used therewith. More particularly, such system should control in a simple and systematic way the interface between the system operator and the various tools and processes to be performed on the system, control all communications between the various software tools in the system and assure that necessary interpretations and translations are performed and manage the sequencing of the tasks to be performed to accomplish a particular objective, so that the operator need merely indicate by a suitable input a desired objective, and the system can proceed to perform in proper sequence the various tasks required to achieve such objective. Such tasks can include transferring necessary information from one software tool to the next and prompting the user for additional inputs where required. Such a system should perform all necessary translations and interpretations between incompatible software tools and all such translations should preferably be transparent to both the user/operator and to the various software tools being run. Such a system should also provide the flexibility to be configurable and reconfigurable by use of relatively simple procedures by a system integrator, with such additions, enhancements, or other changes again being transparent to the operator. In particular, all controls for such a system should be written in an interpretive extension language which permits the controls to be easily modified by the user while still being machine readable. Thus, the system operator would always be utilizing the most recent enhanced version of the system with all its capabilities and should be prompted where appropriate to use such capabilities. To the extent the operator is not familiar with the function of a particular capability, a "help" function could be provided to assist him.

SUMMARY OF THE INVENTION

In accordance with the above, this invention relates to a method and apparatus for a user configurable system which integrates and manages the operation of a plurality of different tasks and software tools, at least some of which tools may be incompatible with the system on which the tools are being utilized and/or with each other. The system contains a list of software tools which may be run on or with the system, the list including an indication as to whether the tools are compatible with the system. A plurality of rule macros are also stored, each of the macros relating to the performance of a particular process. A process to be performed is inputted into the system either by a user or from a prior process and the macro corresponding to the process is retrieved. In response to the retrieval of the macro, tasks involving selected tools are executed in a predetermined sequence. When an incompatible tool is executed, it is encapsulated, causing all transfers from and to the tool to be checked and to be interpreted as necessary. A plurality of the interpretation rules may also be stored at a predetermined location in a macro containing a software tool requiring encapsulation. For each transfer to and from the tool, a check is made to determine if one or more of the interpretation rules apply and the interpretation set forth in the rule is performed when it is determined that an interpretation rule applies to a transferred item. Separate rules may be provided for transfers to an incompatible tool and transfers from an incompatible tool.

For preferred embodiments, each item in a rule macro is written in an interpretive extension language which is both human and machine readable. This would include the interpretation rules used for encapsulation. A macro may contain rules for a plurality of software tools to perform a given task, the rules, among other things, specifying the order in which the tools are to be performed. A macro may also contain a rule or rules which cause the retrieval of a new macro.

Macros may include rules for controlling the sequencing of tools, the interfacing of tools with the system, a user and each other. The user of the system may add or change rules in existing macros or add new macros, all in the interpretive extension language. This results in the rules being recognized by the system and being immediately executable by the system in the extension language. Thus, the system may be reconfigured to accommodate new functions or new tools, to incorporate system or tool enhancement or other changes, to correct errors, or for any other purpose.

The format for at least one of the tools may be different from the format for other tools with transfers occurring in at least one direction between such format incompatible tools. A rules file may be provided, written in an interpretive extension language, which contains format conversion rules for tools having incompatible formats. When there is to be a transfer between format incompatible tools, the appropriate format conversion rules are retrieved from the rules file and are utilized to control format conversion of material to be transferred between such tools.

There may also be incompatibilities in valid character strings (i.e. valid names) between tools. A rules file is also provided which is written in an interpretive extension language which contains translation rules for tools which have such name incompatibility. When there is a transfer between name incompatible tools, appropriate rules in the rules files are retrieved and utilized to effect translations necessary to render the tools compatible.

When a name in the original language is translated to a name in the generated language, an entry is made in a name list for the original and generated names. When there is such an entry for a name requiring translation, the entry is utilized to translate the name. Where there is not an entry for a name to be translated, the appropriate rules in the rules file are utilized to translate the name. When a translation is effected utilizing rules from the rules file, a check may be performed after the translation to remove invalid characters, to truncate the translated name to an appropriate maximum length if necessary, to add any required prefixes or suffixes to the translated name and to modify the translated name to be unique if a unique translated name is required for each name to be translated and such modification is possible. An alias file may be generated and stored of all entries made for a given use, and the alias file may be retrieved and used when a subsequent transfer between the same two tools is required. It is also possible for such alias files to be originally provided along with the translation rules. A capability may also be provided to permit an original name to be retrieved from the generated name. Where the translated or generated name is not unique, a list of original names may be provided for each generated name.

One or more of the tools may also include a nested hierarchy of material on components or other items with different names being utilized for the same item at different levels in the hierarchy. A rules file is provided containing at least translation entries for the names of the various hierarchy levels, such rules file being utilized to obtain the appropriate name for an item at a given hierarchy level. The rules for naming an item may also be different at different hierarchy levels and the rules file may also include translation rules for the hierarchy levels.

Input information may also be required from a user for at least some tools. Such inputs may be data or control inputs or may be graphic waveform inputs. For data and control inputs, a rules list, written in an interpretive extension language, provides default inputs for each stage where such inputs are required for each tool. When a tool is at a stage where such inputs are required, the default inputs for such stage are displayed to the user. The user may make changes to the default inputs and the default inputs as modified by the user are communicated to the system or the tool. The default input display may also prompt the user as to items which the user must add as inputs at a given stage in the tool, further operation of the tool being inhibited until the user makes such required inputs, and may also prompt the user as to optional items which the user may add as inputs at the given stage in the tool.

For graphic waveform or related inputs, tables are provided which define the various digital states for waveforms to be inputted and which define logic rules for operating on or interacting with such waveforms. User inputted, generated or default waveform displays may be displayed utilizing the stored digital state information and commands from various sources may be executed of the waveform or other graphics utilizing, as required, the stored defined states and logic rules.

The foregoing and other objects, features, and advantages of the invention will be apparent from the following more particular description of a preferred embodiment of the invention as illutrated in the accompanying drawings.

IN THE DRAWINGS

FIG. 3A is an illustration of more detailed steps for performing one of the functions illustrated in FIG. 3.

Figure 4A:
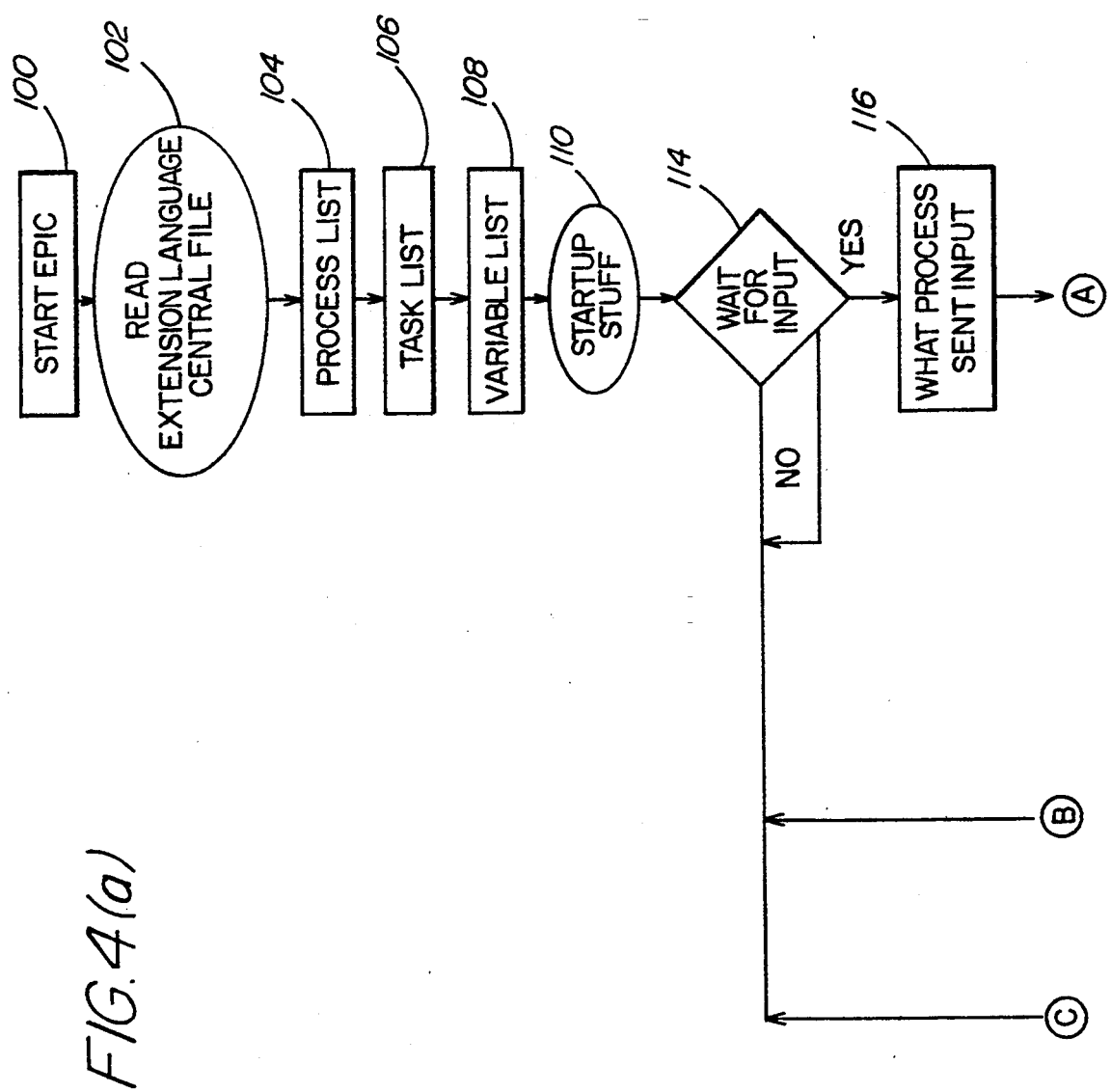
Figure 4B:
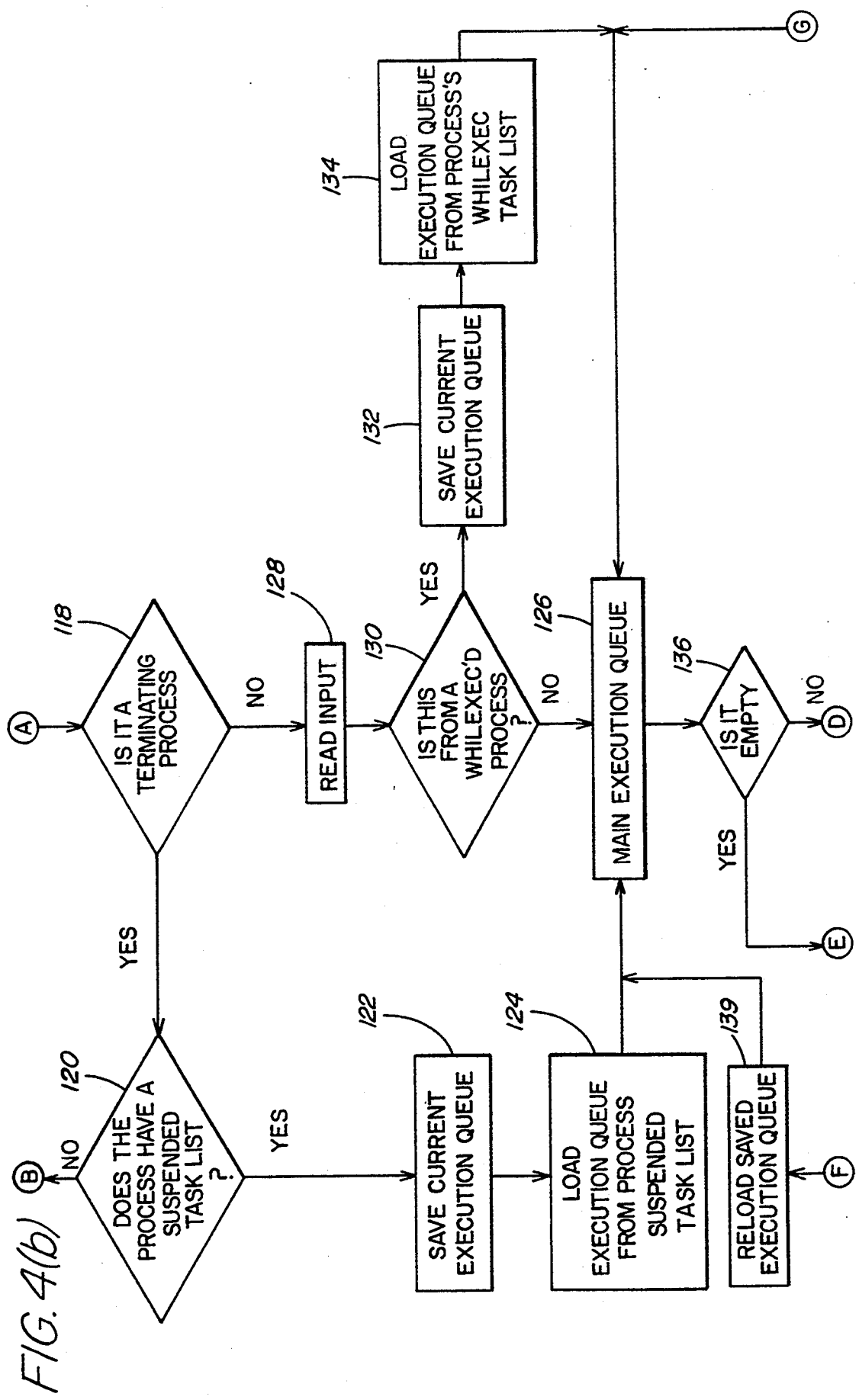
Figure 4C:
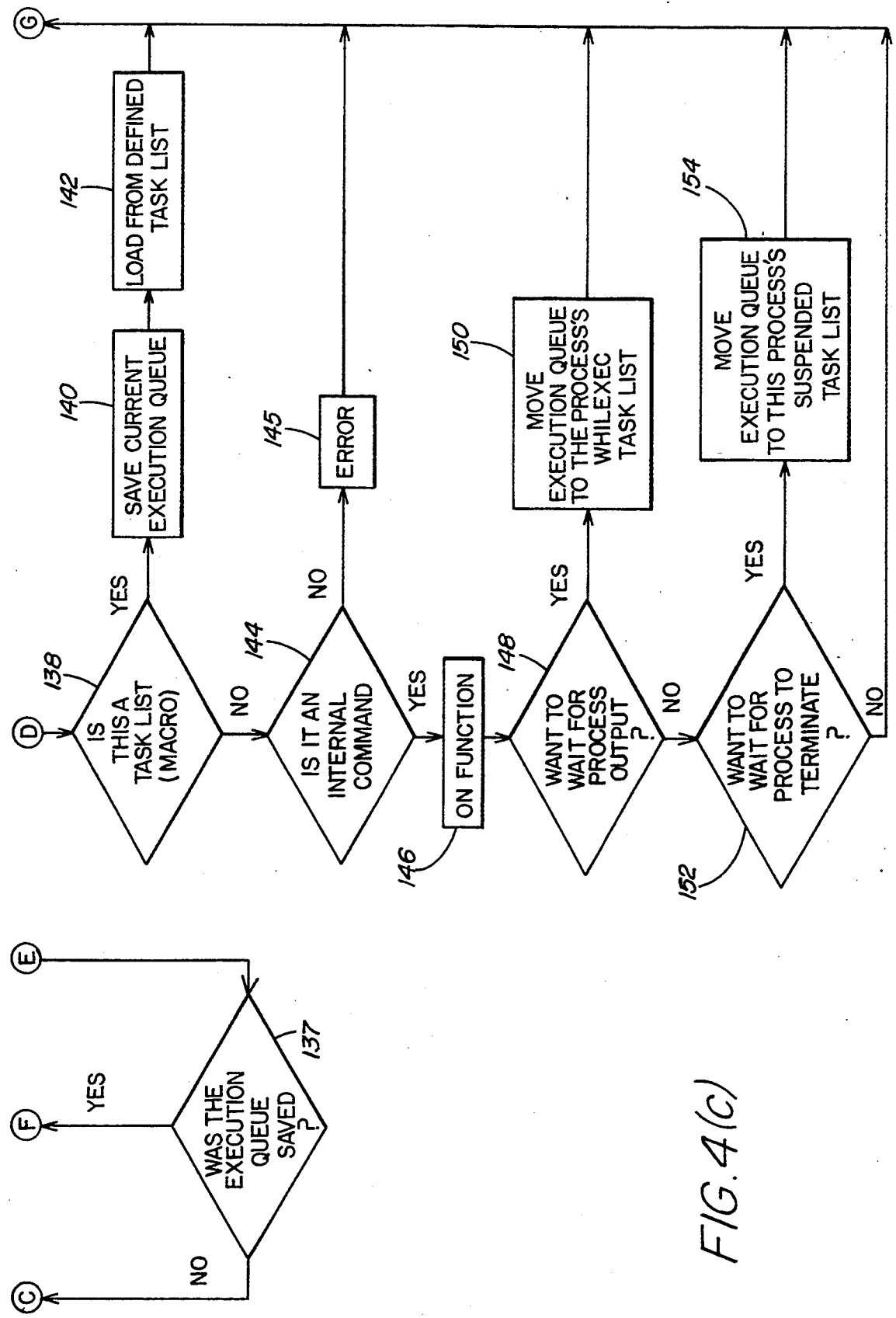

FIGS. 4(a), 4(b), and 4(c) are flow diagrams of the basic Epic process which may be utilized for control and management in practicing a preferred embodiment of the invention.

Figure 5:
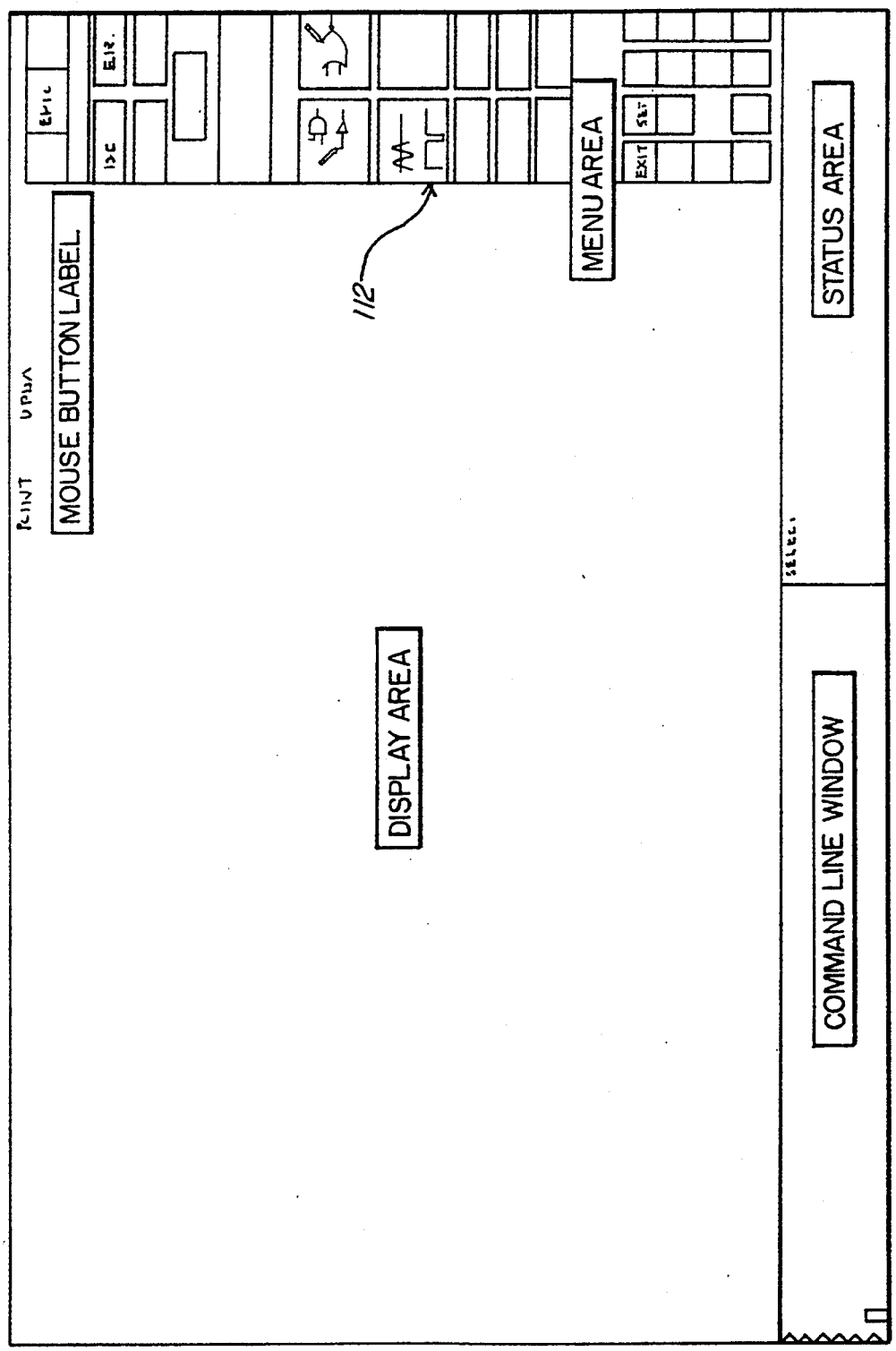

FIG. 5 is a diagram illustrating the default display format for a preferred embodiment of the invention.

FIGS. 6A and 6B taken together, show an illustrative instruction set for the Epic rules file, including two illustrative macros, for a preferred embodiment of the invention.

Figure 7:
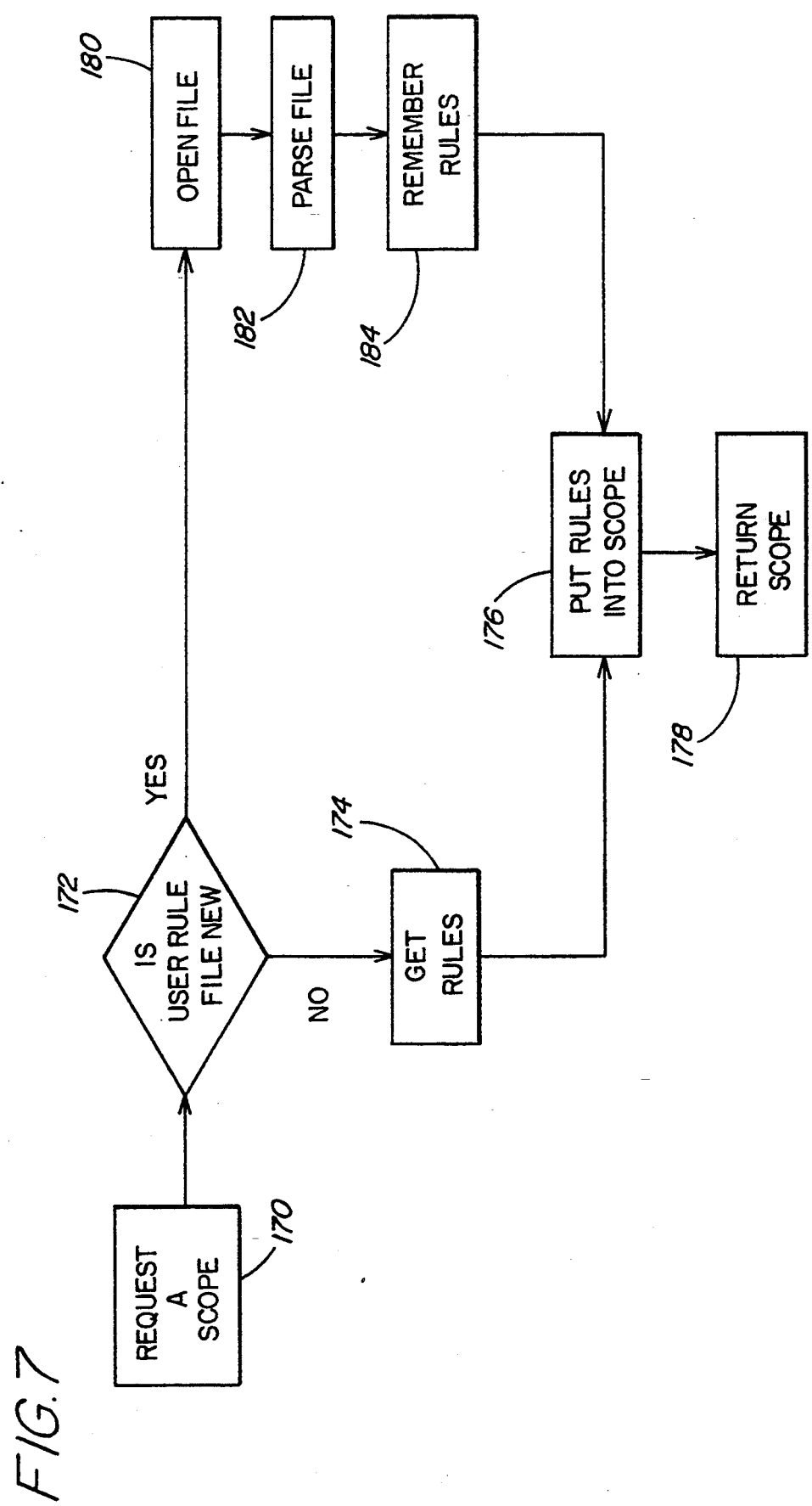

FIG. 7 is flow diagrams for the process of setting up of a "scope" for use in a general renaming operation in accordance with a preferred embodiment of the invention.

Figure 8:
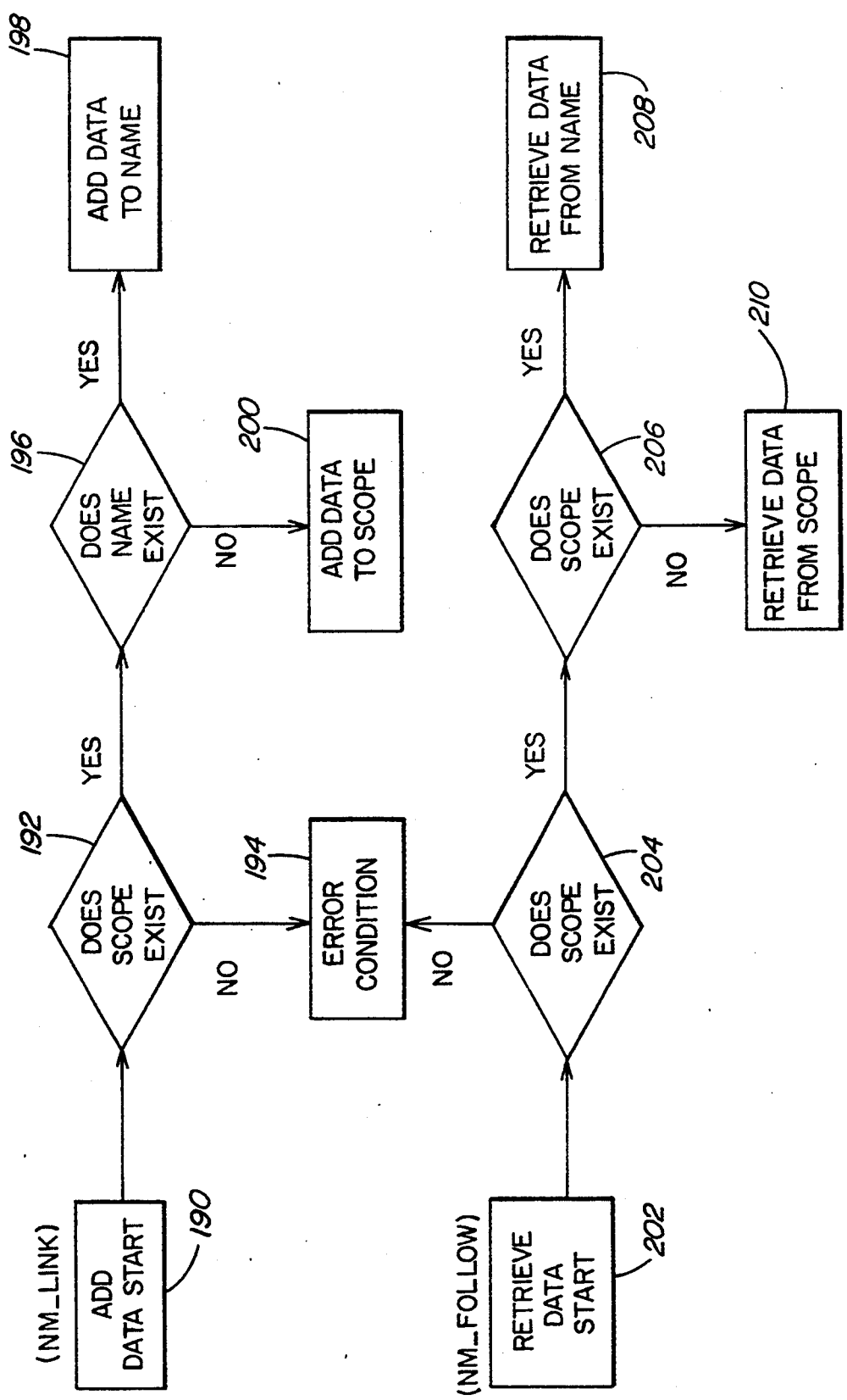

FIG. 8 is a flow diagram of routines for adding specific information to and retrieving specific information from a "scope".

FIGS. 9(a) and 9(b) are flow diagrams of the general renaming routine.

Figure 10:
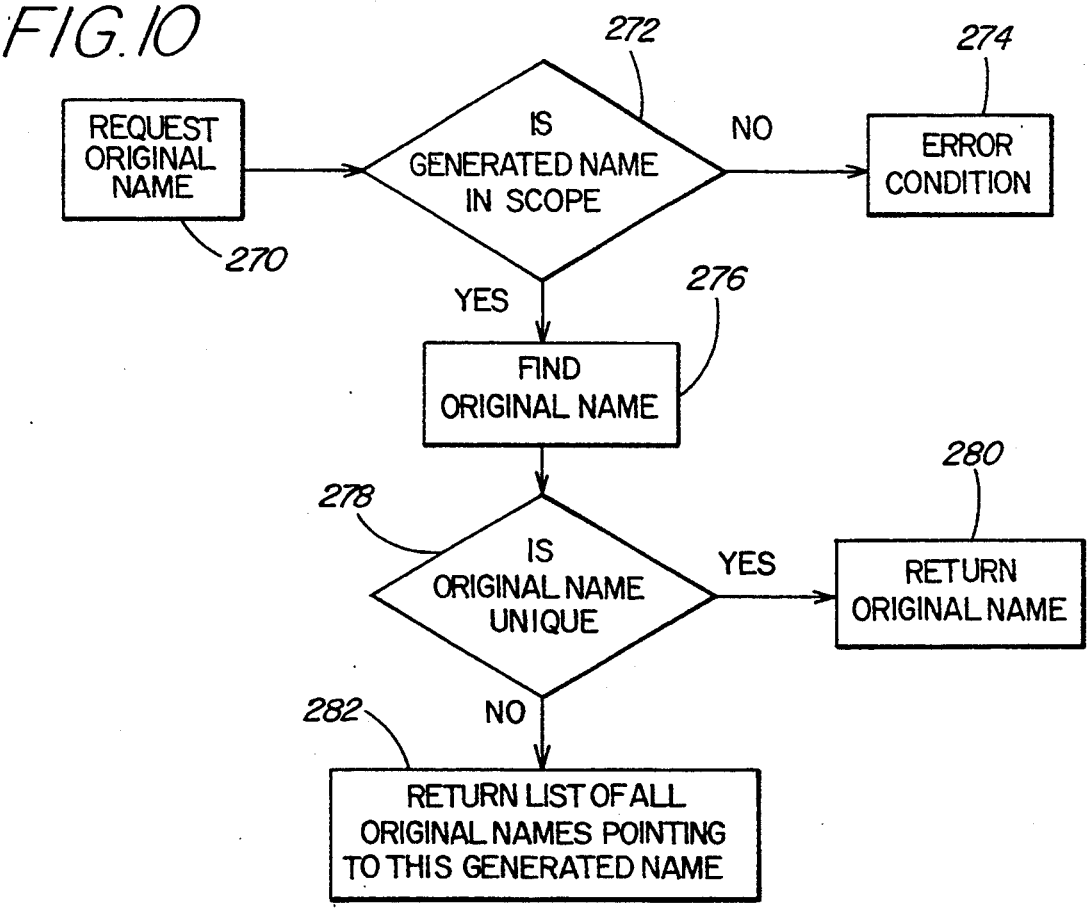

FIG. 10 is a flow diagram of an operation to obtain an original name from a generated name in the general renaming routines.

Figure 11A:
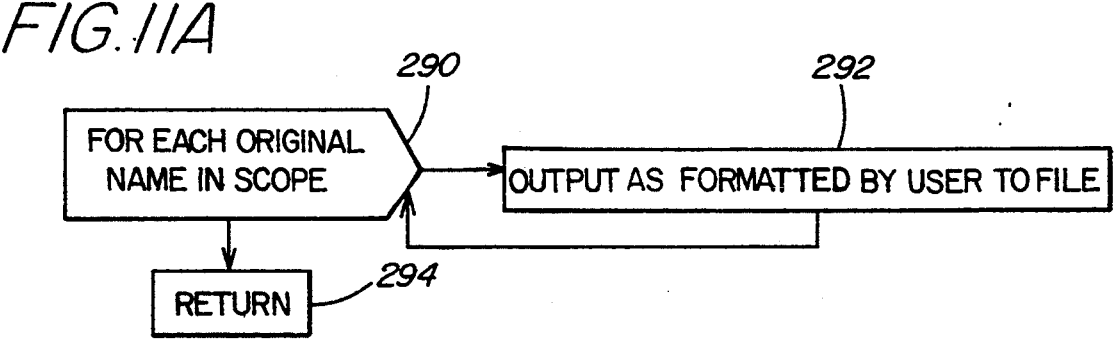
Figure 11B:
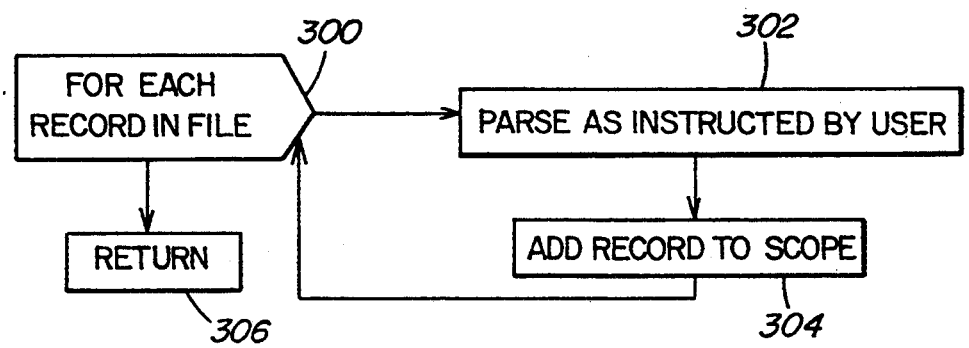

FIGS. 11A and 11B are flow diagrams for the generating of an alias file and the reading of an alias file, respectively.

Figure 12A:
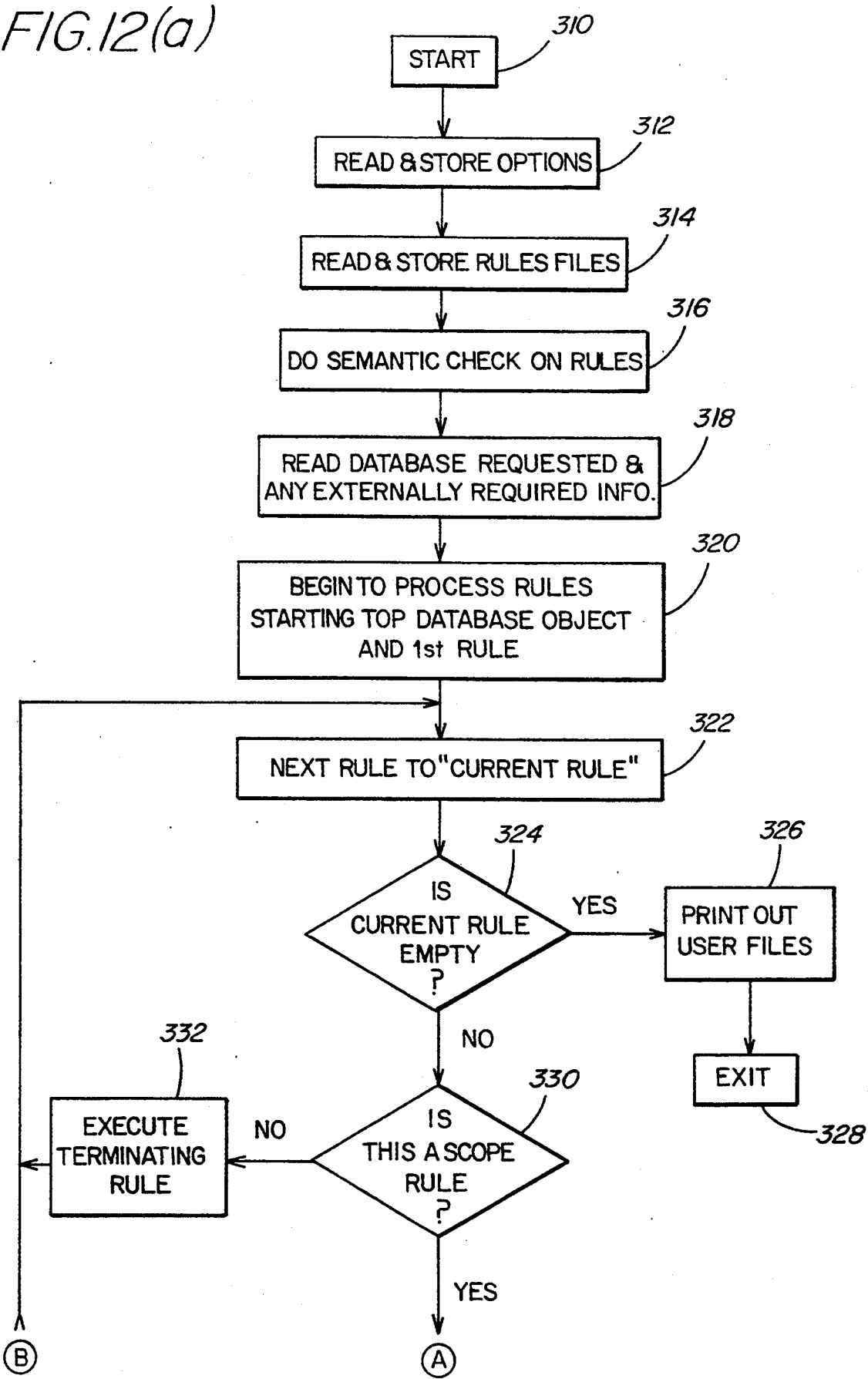
Figure 12B:
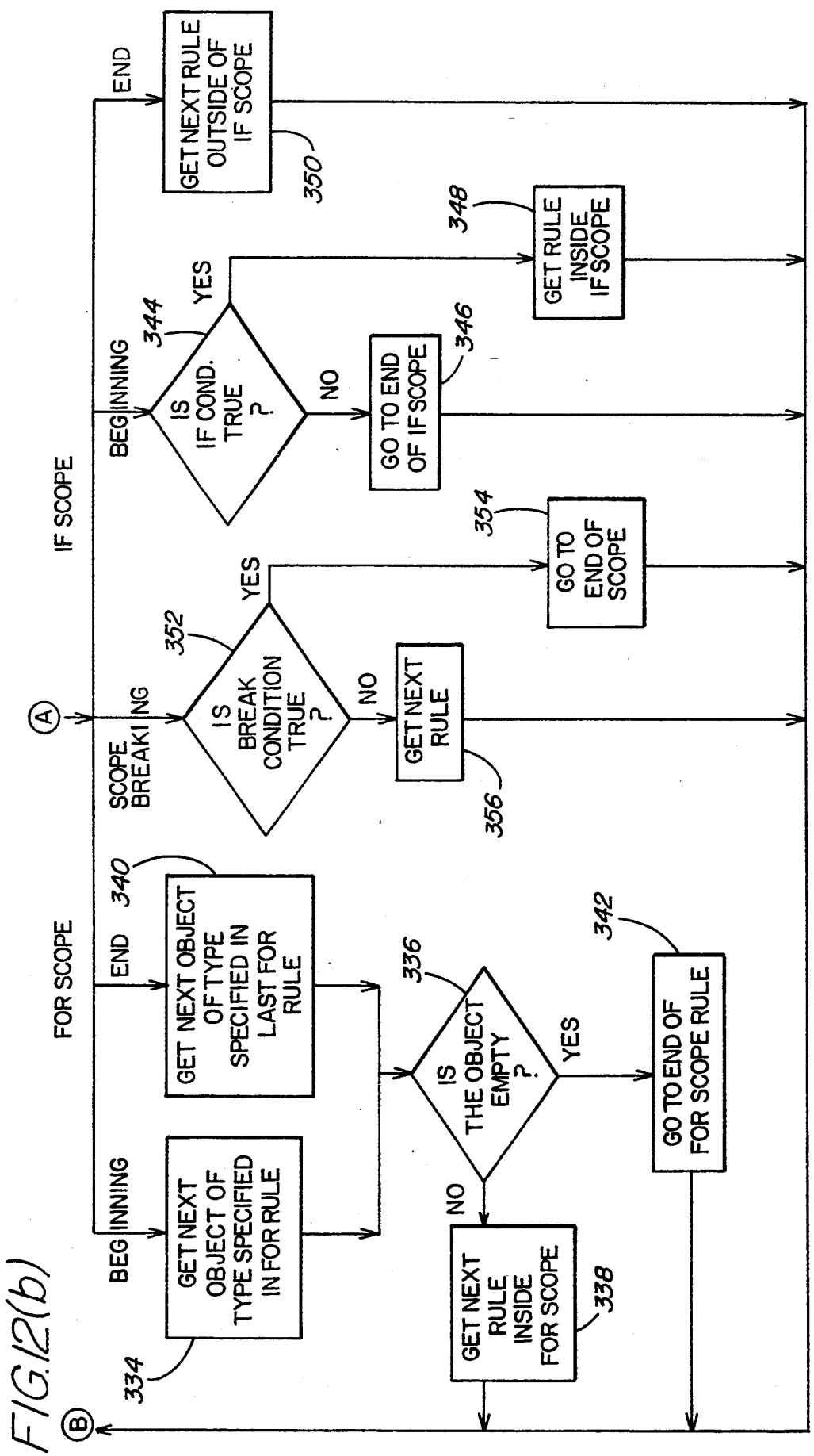

FIGS. 12(a) and 12(b) are flow diagrams of a rules based interface routine.

FIG. 12A is an example of an entry in an rbi rules file

Figure 13A:
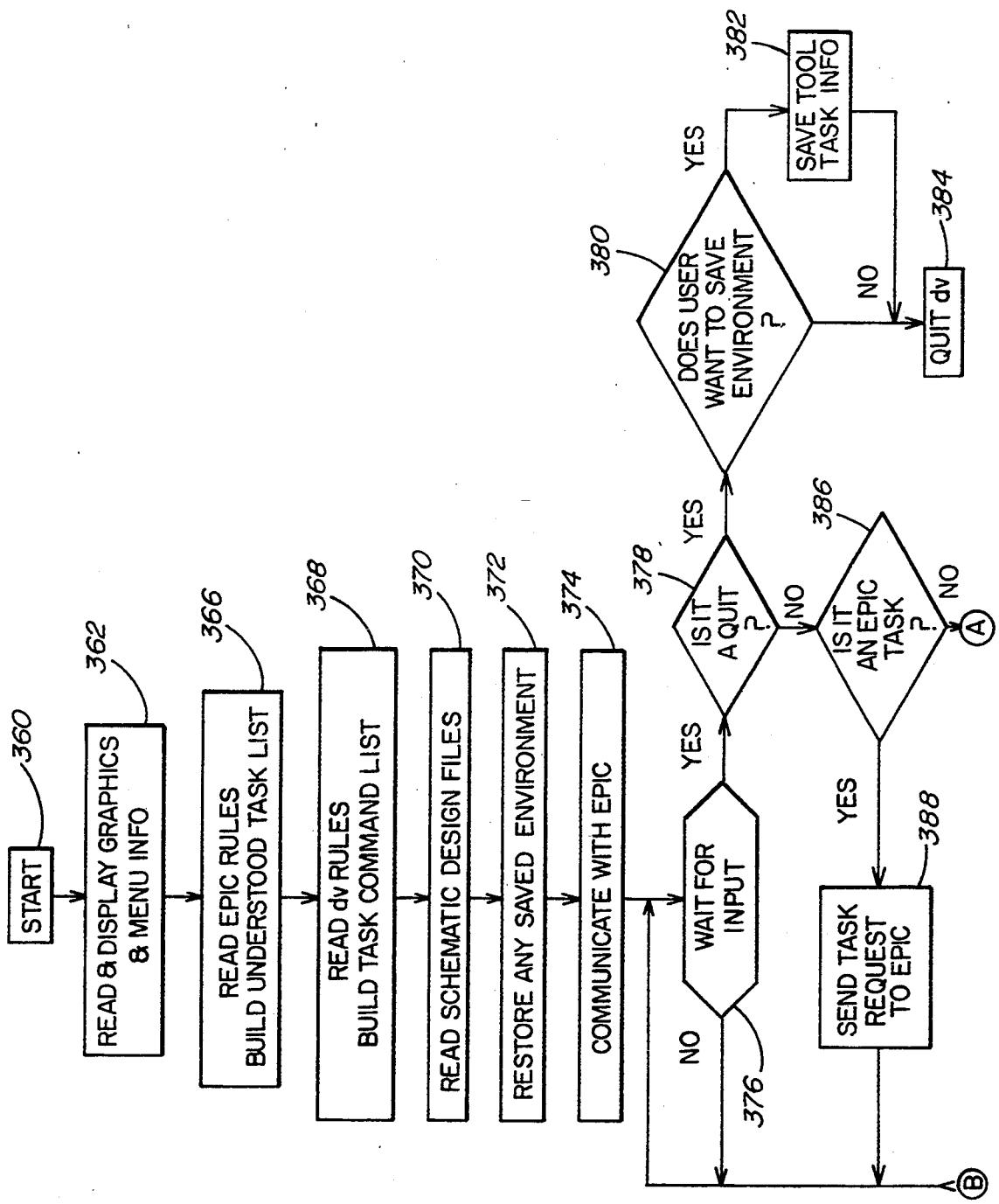
Figure 13B:
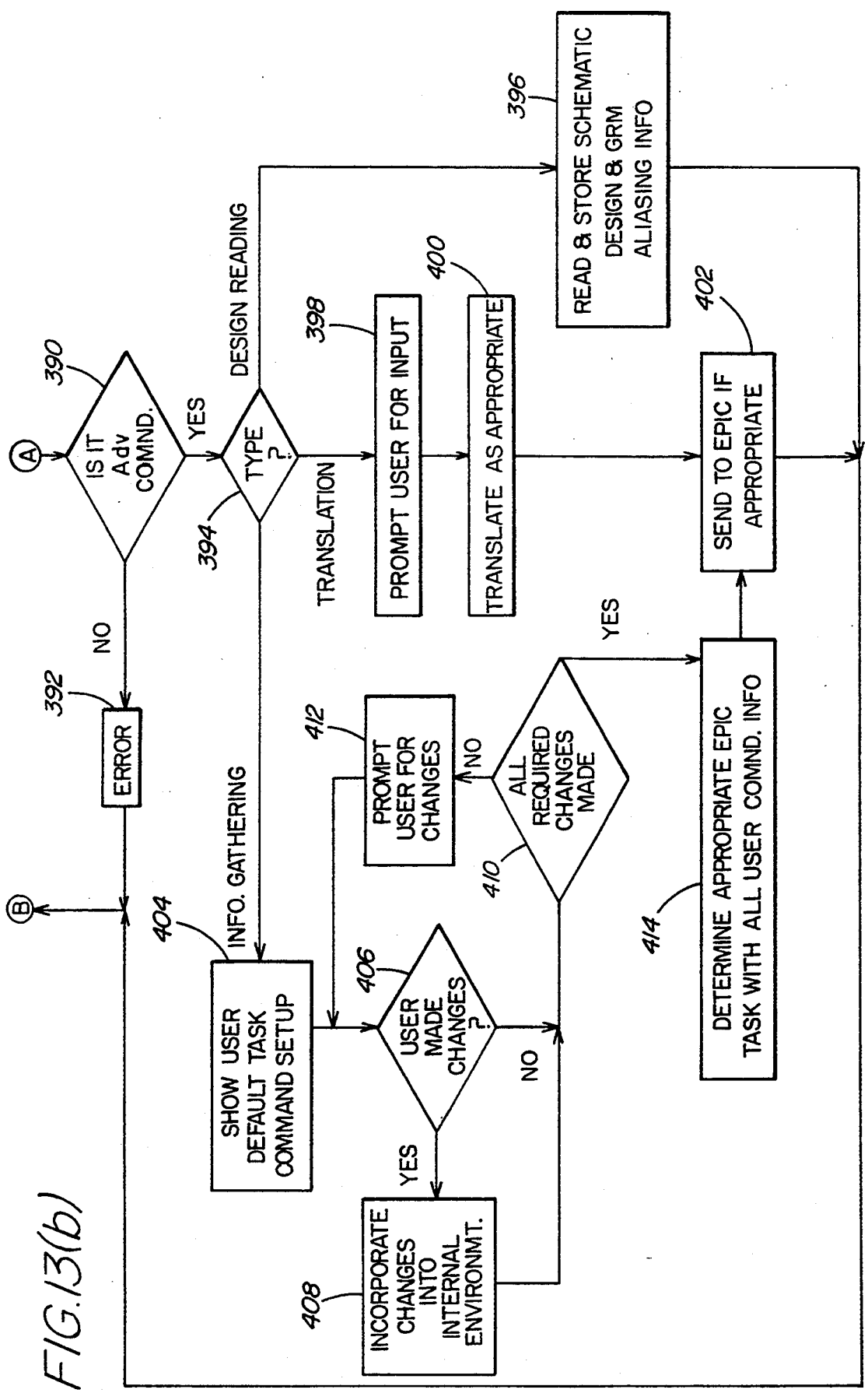

FIGS. 13(a) and 13(b) are flow diagrams of a design verify (dv) routine which serves as a user interface in gathering information for use in various tools.

FIG. 13A is an exemplary section of a dv rules file.

Figure 14:
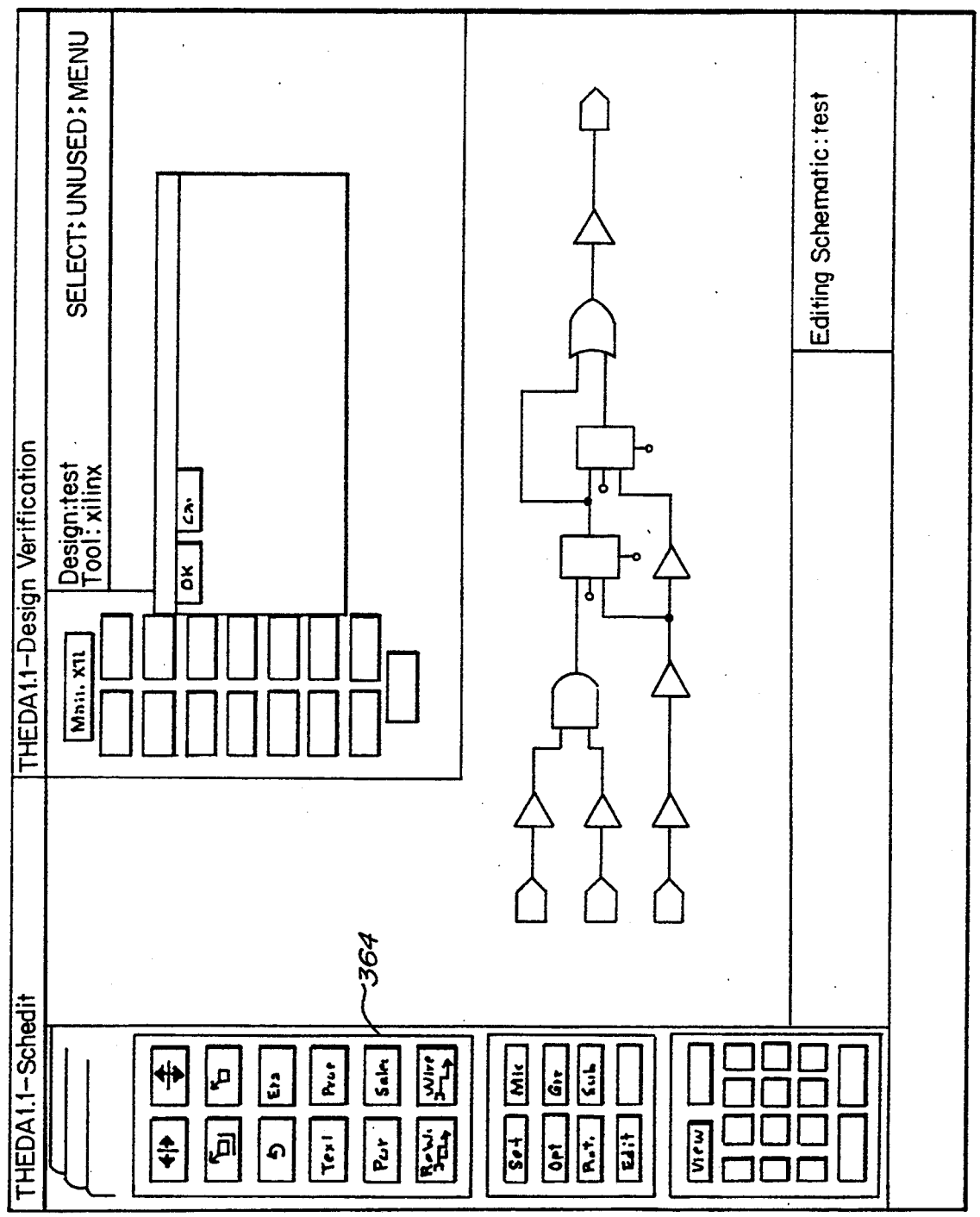

FIG. 14 show an illustrative display for use with the dv routine.

Figure 15A:
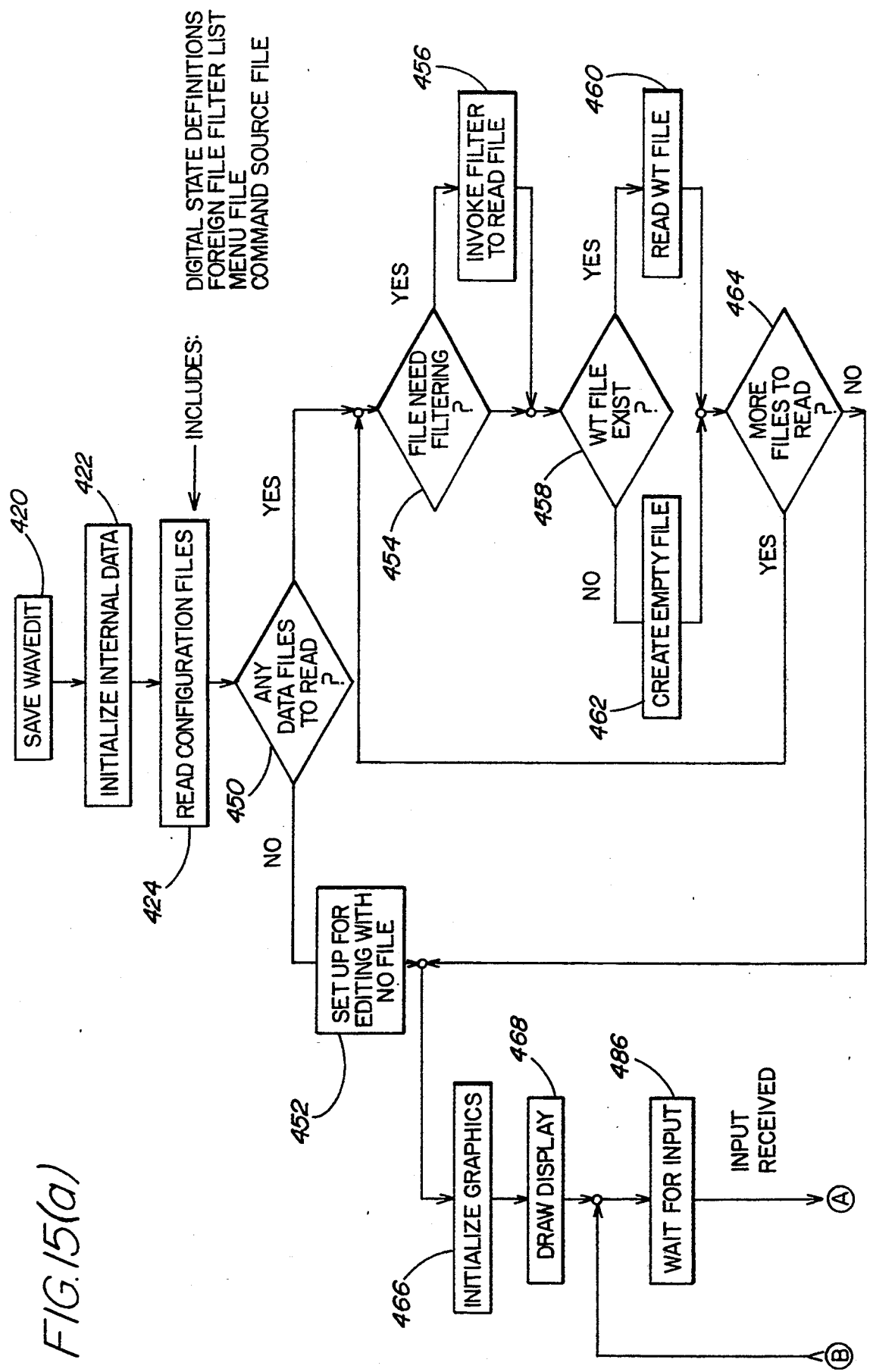

FIGS. 15(a) and 15(b) are flow diagrams of an interactive graphics routine referred to as Wavedit.

Figure 16:
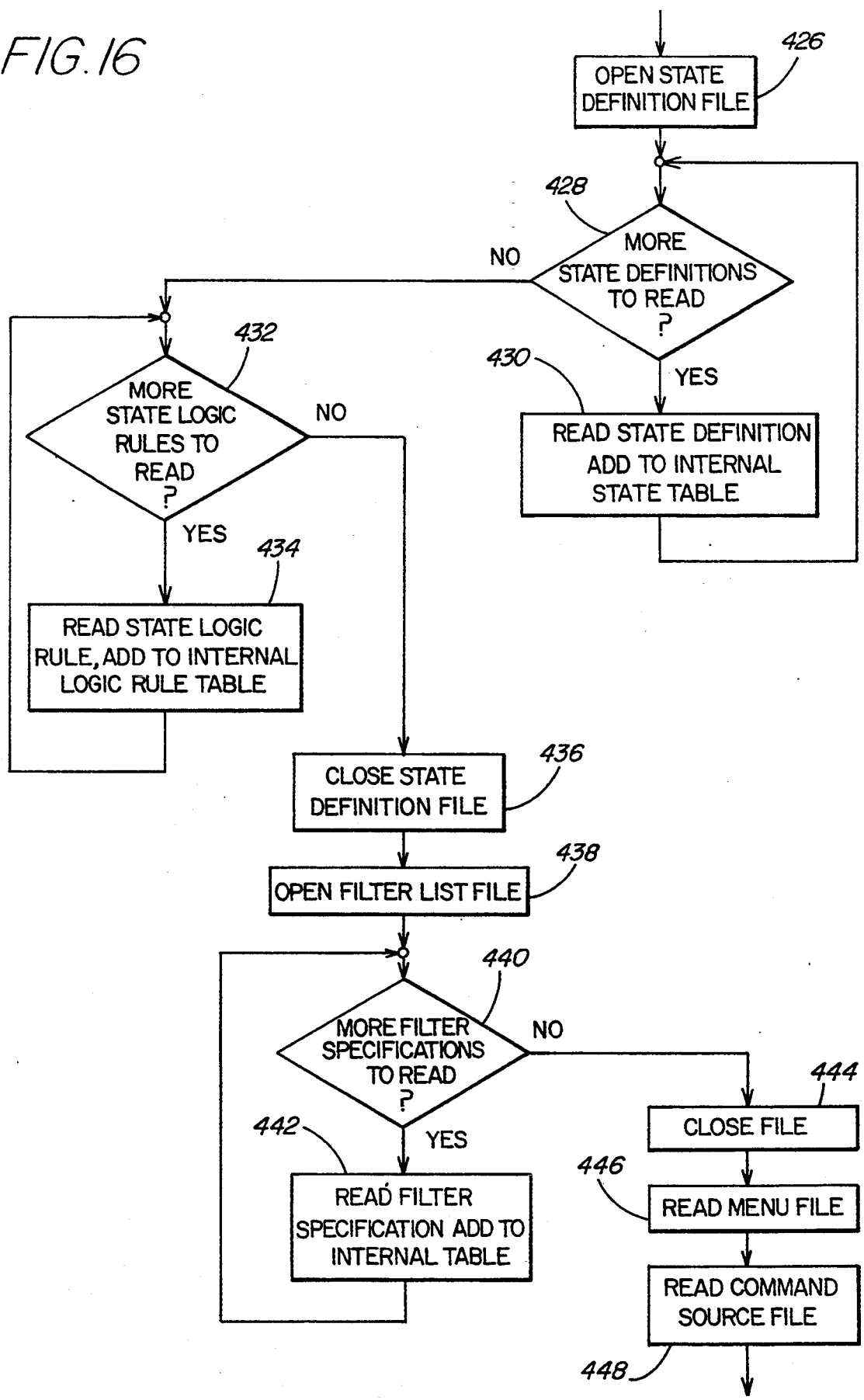

FIG. 16 is a more detailed flow diagram of the read configuration files step of FIG. 15.

Figure 17:
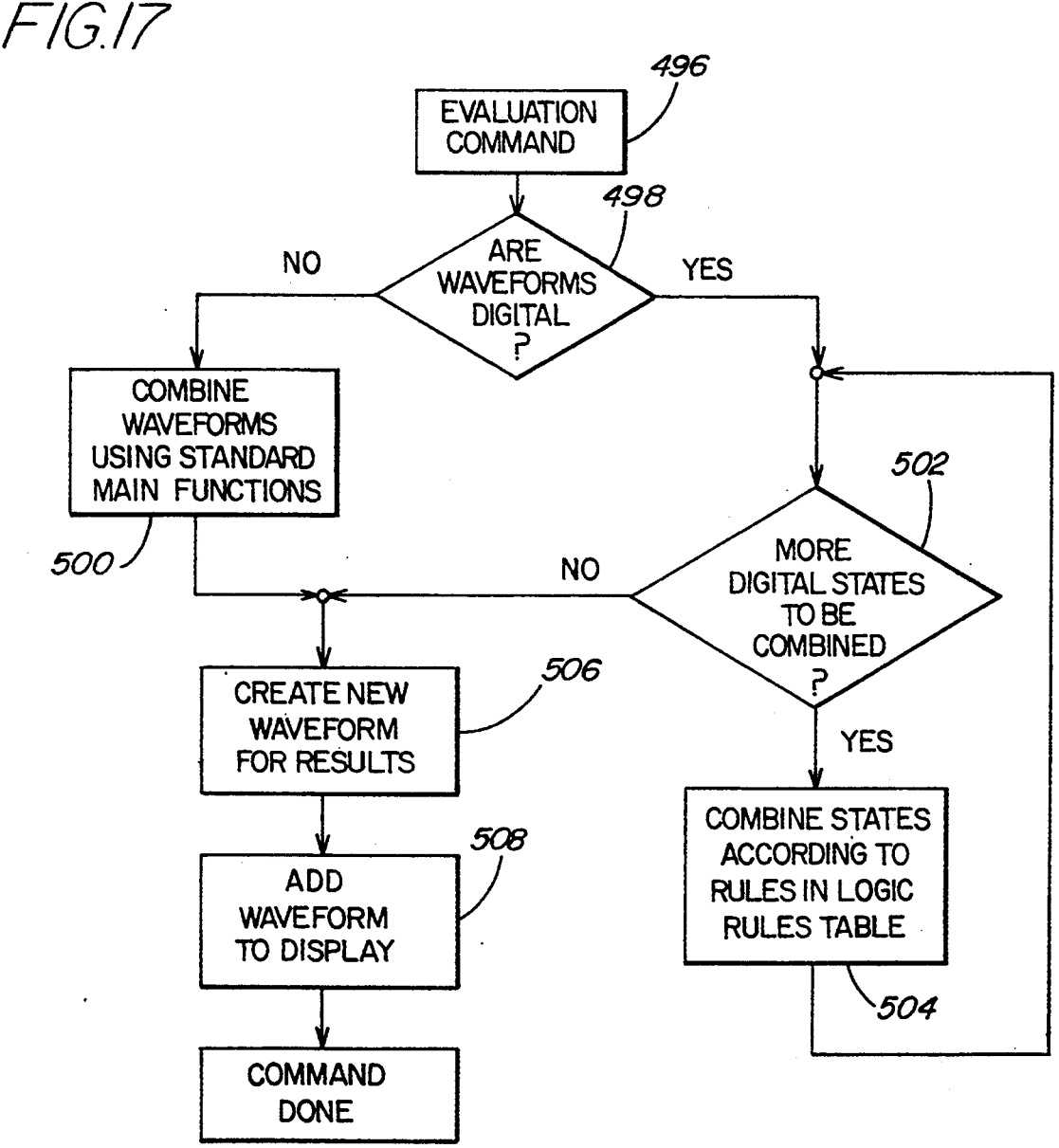

FIG. 17 is a more detailed flow diagram of the "execute command" step of FIG. 15 as illustrated for an illustrative command.

Figure 18:
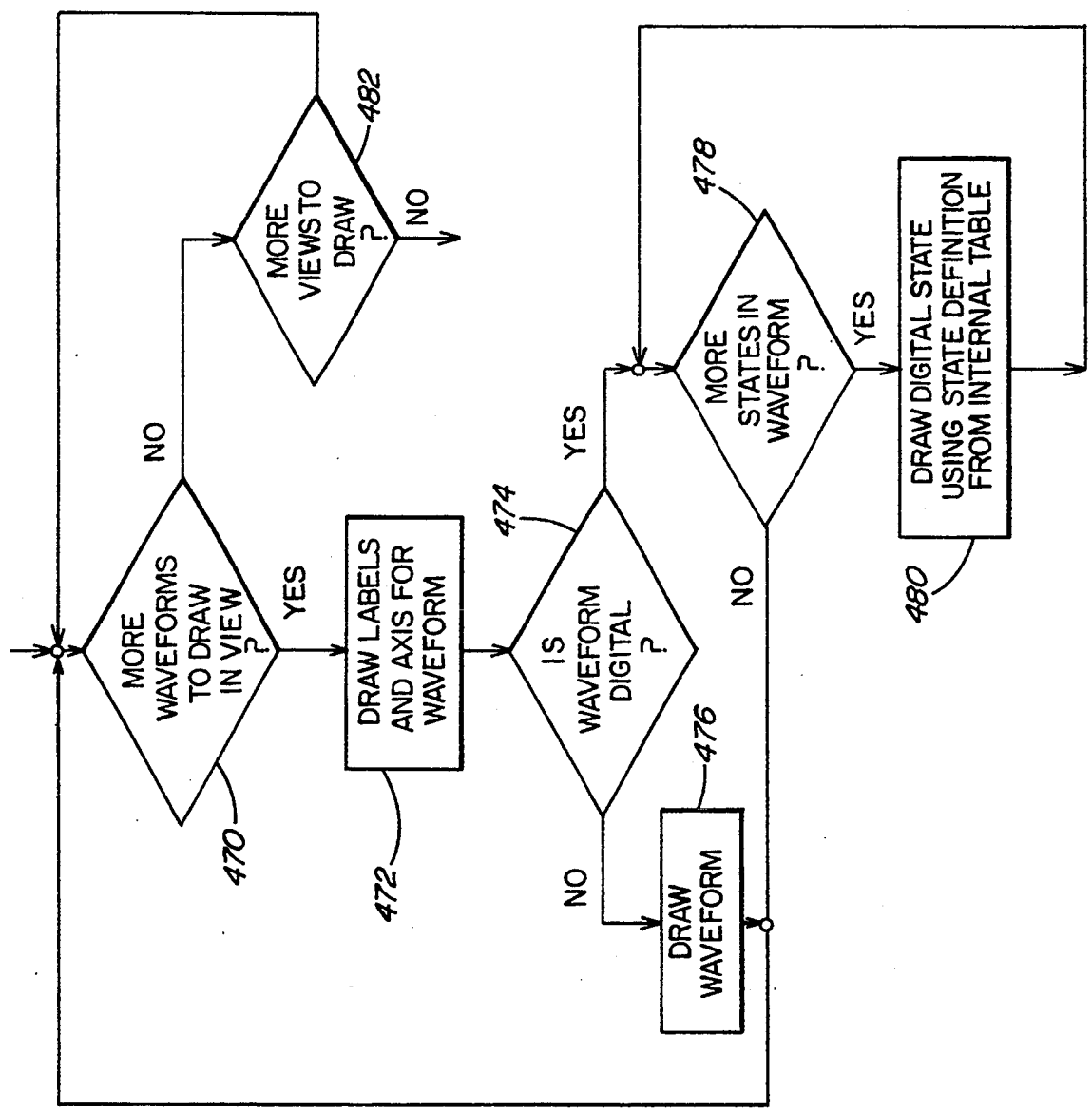

FIG. 18 is a more detailed flow diagram of the "draw display" step of FIG. 15.

Figure 19:
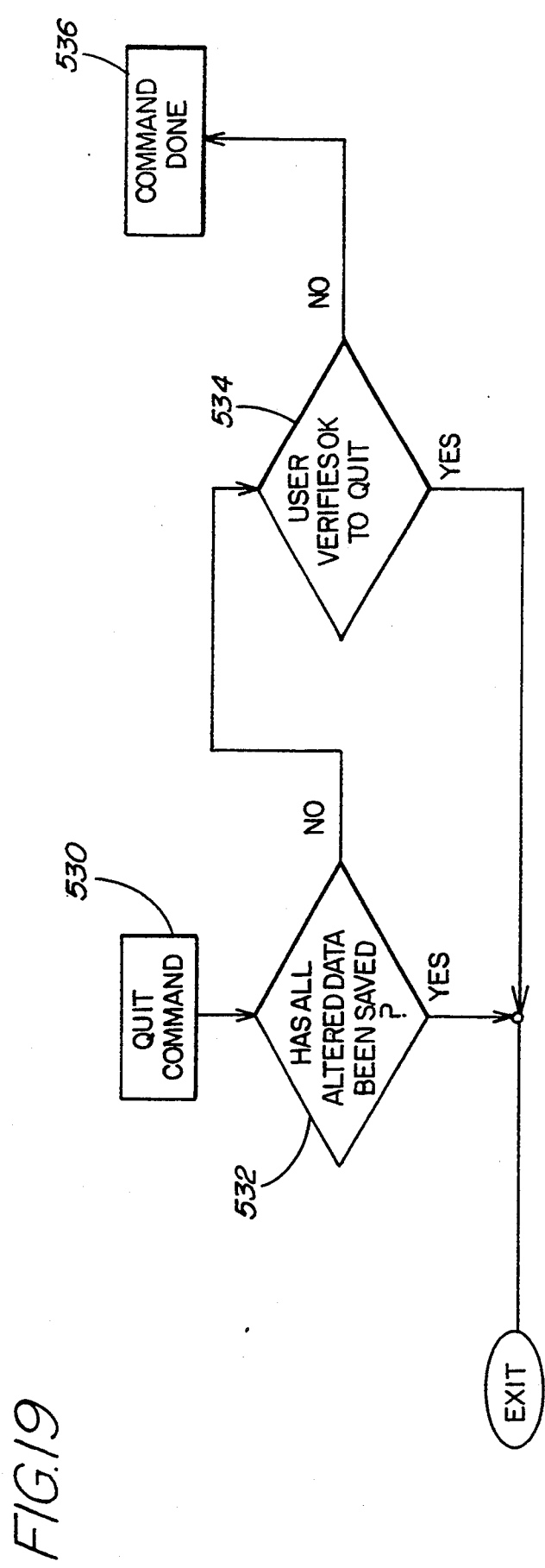

FIG. 19 is a flow diagram of operations performed in the Wavedit routine when a "quit" command is received.

DETAILED DESCRIPTION

Figure 1:
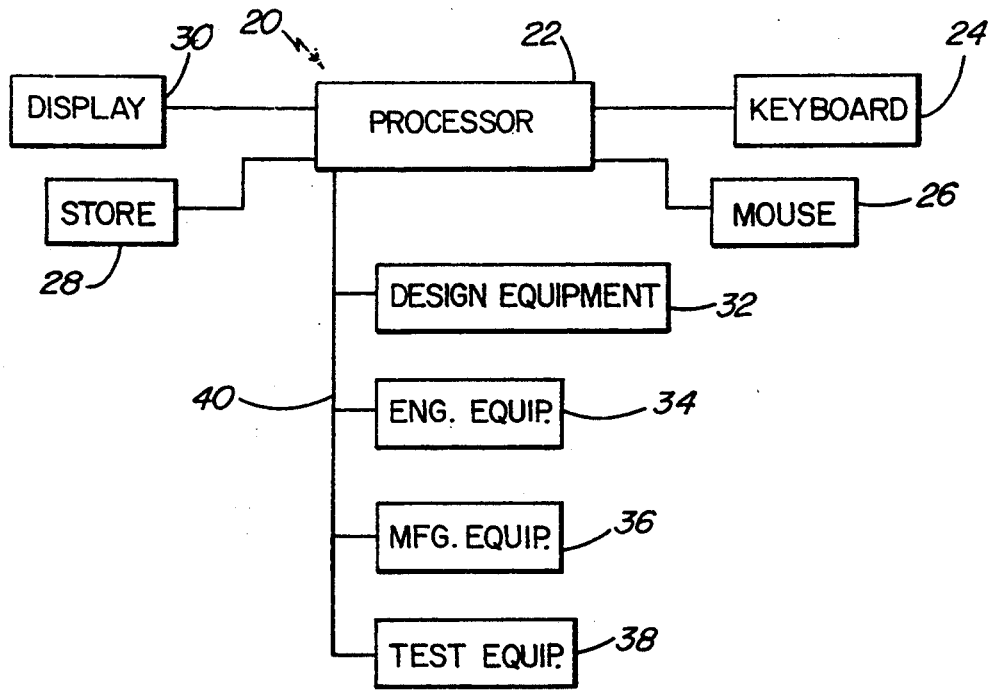
FIG. 1 is a schematic block diagram of a system in which the teachings of this invention might be employed.

Referring to FIG. 1, a system 20 in which the method and apparatus of this invention might be practiced includes a processor 22 of adequate capacity to perform the various functions of this invention. A suitable processor might, for example, be a Sparc System manufactured by Sun Microsystems. The processor would typically have various input devices such as a keyboard 24 and/or a mouse 26 which can be manipulated by a user. A mass storage device 28, which might be any one of a variety of standard disk drives is also provided for storing various files used with the system and a display device 30, such as a standard cathode ray tube (CRT) display, may interface in standard fashion with processor 22 to provide various screen displays used by the system. Such screen displays may include menus of icons or other menus from which selections may be made by use of mouse 26, keyboard 24 or other standard input device in known fashion, and may also include alphanumeric displays of various files and data used by the system and various graphic displays including schematic diagrams.

The programs and files which form part of this invention may be utilized to control and manage the sequencing of various computer programs, which may also be referred to hereinafter as software tools, which run on processor 22, as well as software designed to operate with or control the operation of various other equipment used in the system including, but not limited to, design equipment 32, engineering equipment 34, manufacturing equipment 36, and test equipment 38. The external equipment may be connected to processor 22 by one or more standard input-output busses 40. All of the equipment on bus 40 may be located at a single site, or some of the equipment may be located at different sites and connected to processor 22 by a networking system or other suitable communications facility.

Figure 3:
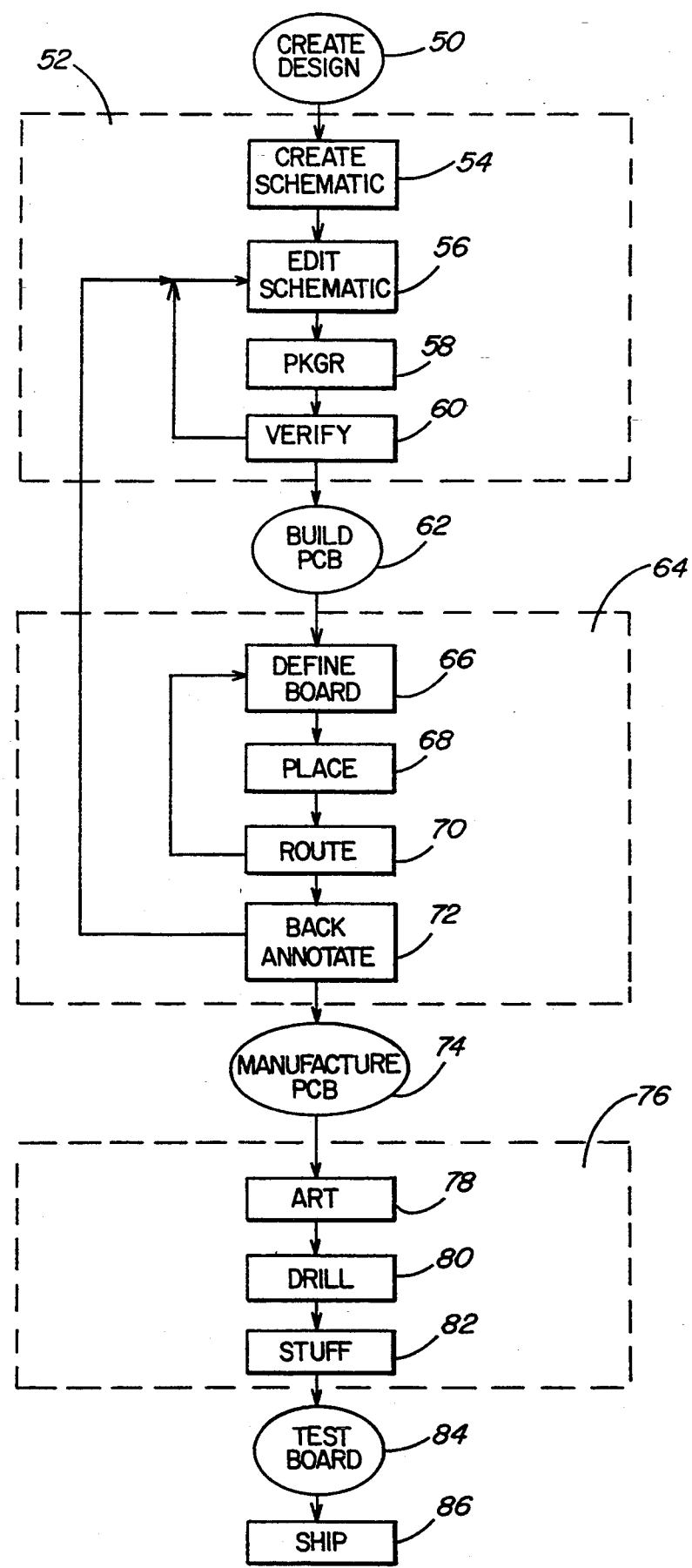
FIG. 3 is a flow diagram of an exemplary process which might be run utilizing the teachings of this invention.

FIG. 3 shows a typical process which might be performed using the system shown in FIG. 1 and the teachings of this invention. In this case, the invention is being utilized to design and manufacture a printed circuit board (PCB). The user might start the process by selecting "Create Design" from a suitable menu displayed on display 30 (step 50). This might cause a macro to be selected from store 28 in a manner to be described later which may perform certain housekeeping functions and might then result in the calling of an appropriate tool to "build schematic". This is illustrated by the dotted box 52. The first step in this operation might be to call for a tool which would result in creating a schematic (step 54). As part of this step, the user might indicate the type of circuit which is to be designed and the system might display a circuit for performing such function. The user could either use that circuit and go on to step 56 to edit the standard or default schematic shown, or could indicate that he wishes to create his own schematic, in which case a different tool would be called which would permit the user to create a schematic from scratch.

When the user finishes creating a schematic, the system might then proceed to step 56 to call forth a suitable macro which, in turn, would call forth a suitable software tool or tools to permit the schematic to be edited. Once a suitable schematic has been created and edited, the operation proceeds to step 58 to call forth suitable macros and tools to cause the schematic to be packaged, and then proceeds to step 60 to verify the design. The verify step could include calling forth appropriate tools to verify both the schematic logic and the schematic electronics. FIG. 3A, which will be discussed shortly, illustrates various steps which might be performed during the verify step 60. If during verify step 60, it is determined that there is an error in the logic or electronics, the operation may return to step 56 to further edit the schematic to overcome such a problem.

Once the design has been verified, the user could either be advised that the design had been verified and coached as to possible next steps or, as may be preferable, the system could automatically proceed to step 62 to build the PCB. Dotted box 64 illutrates various steps which might be performed doing the "build PCB" operation. For each of these steps, a suitable macro would be called which would, in turn, result in the calling of appropriate tools to perform the function. The exemplary functions shown for the build PCB function include defining the board, step 66, placing components on the board, step 68, routing traces for the board, step 70, and back annotating, step 72, if there is any modification. If there is a problem during step 70, in that it is not possible to route traces, the operation may return to step 66 to redefine the board to overcome the problem. Similarly, if problems persist, it may be necessary to return to step 56 to edit the original design so that it may be more easily packaged and built. Ideally, the completion of each of the steps 66–72 results in the calling of the appropriate subsequent steps.

Once build PCB step 64 has been successfully completed, the operation may automatically call for the first macro required to perform manufacture PCB step 74. In the alternative, the completion of the build PCB step 64 may merely result in a suitable display on display 30, alerting the user that the system is ready to commence manufacture of the board. The manufacture PCB step might include the steps shown in dotted box 76. These steps include creating the board from the art work generated during step 64, step 78, drilling necessary holes in the board, step 80, and stuffing or inserting components in the board, step 82. The macros for performing the various steps 78, 80 and 82 might, at appropriate points, cause various pieces of manufacturing equipment 36 to be utilized, including providing necessary control inputs and data inputs to such equipment so that the equipment may properly operate. It might also include controlling equipment to automatically transport the board between various manufacturing equipment as required.

When prototype boards have been fabricated during step 76, the boards need to be tested. This is accomplished during step 84 and, depending on the equipment utilized, may either be performed on the same equipment on which the board was manufactured, in which case, the macros running on processor 22 may cause the system to automatically start testing the boards when the fabrication of the boards are completed, or the boards may be tested on separate equipment. In the latter case, the boards must be either automatically transported to such other equipment in response to suitable macros running on processor 22 or the processor must go into a hold state, prompting the user to move the board to test equipment, and proceed to call for appropriate macros for controlling the test operations only when the user indicates that the board is at an appropriate test station. If the boards do not successfully pass a test, depending on the problem identified, the process may return to step 56, to step 66, to step 78, or to any other one of the intermediate steps where testing determines that a problem exists which needs to be corrected. The system, either using rules provided in the system, or by prompting the user for inputs, would then correct the problem. Once the board had been successfully tested, the system could control the shipping of the board, if desired, during step 86.

Thus, it is seen that, at least theoretically, by operating a single control, with suitable macros, the system could cause the entire sequence of operations shown in FIG. 3 to be performed, prompting the user for specific inputs as required, or to take specific action as required. Thus, the system could be utilized by an operator who has little knowledge of the system or of the various tools being run thereon, but who is highly knowledgeable in the design and construction of PC boards. Further, even this knowledge need not be extensive since the system may provide default inputs in most instances where inputs are required, so that the inputs required from the user might be fairly limited.

Many of the software tools required to perform the various functions shown in FIG. 3 may come from different vendors and may be incompatible in language, names, format, and other factors. Such programs may also be incompatible with the basic control programs being run on processor 22. To overcome this problem, the system has the capability of automatically performing interpretations and translations as required for information transfers between various incompatible software tools and for also performing necessary interpretations and translations for data transfers between the systems software being run on processor 22 and various software tools that are incompatible therewith. All such data transfers are performed in a manner which will be described later which is transparent both to the user of the system and to the various software tools.

The system, as will also be discussed in greater detail later, also has the capability to prompt the user for inputs when inputs to a software tool being executed are required. It is possible to provide default inputs in many instances which will be utilized by the system if the user does not change these inputs, substantially simplifying the data input process for the user.

FIG. 3A illustrates a more detailed sequence of operation which might be performed when doing the verify step 60 of FIG. 3. Referring to FIG. 3A, the first such step is to run a "Design Rules Checker" on the electronic schematic generated during steps 54, 56 and 58. "Design Rules Checker" is a software tool available to the system for verifying the logic or electronics of the schematic. The macro which would be called in conjunction with the running of the design rules checker would also control the obtaining or providing of necessary inputs to this software tool, to the extent such inputs are required, and would also control any translations which may be required for information or instructions being provided to this software tool.

When the design rules checker operation is completed, the system checks to see if the design checker was completed successfully. If it is determined that the design checker was completed successfully, then the system calls the software tool which is titled "Signal Net List Extractor for a Digital Simulator". Again, inputs would be provided and translations performed as required. If the extractor extracts correctly, then the system calls a software tool called "Digital Simultor". The "Simulator" tool is run using a behaviour control macro which may be one of the macros of the control system being run on processor 22 or may be a separate software tool. The results of the simulator are displayed using a separate software tool called "Electronic Signal Wave Editor". Any errors found in the electronic schematic design file being verified are highlighted. This may be accomplished using a macro in the basic system or a separate software tool may be called for this purpose. The highlighting, which may, for example, be accomplished by flashing the wire, component, or other circuit element in which a problem has been discovered, notifies the user of the potential problem.

The user may then take steps to correct the problem or the system itself, using rules provided in a macro, may either suggest to the user possible solutions for the problem or, following rules provided, make an appropriate correction in the schematic to correct the problem.

If the extractor did not extract correctly, then the user would be notified in an appropriate way of the signal net list extractor error. As with the simulator, the system may also suggest potential corrections for the error or undertake to correct the error itself. Similarly, if the design check did not complete successfully, the user would be notified of violations in the electronic design rule and the system again could also provide an indication of potential corrections or attempt, using rules, to correct the problem itself. When the verify operation is completed, the system would return to the schematic editor, proceed to the build PCB step 62 or take other appropriate exit action.

In accordance with the teachings of this invention, the various functions are performed under control of a rules based management and control system or program which will sometimes be referred to hereinafter as "Epic". As will be described in greater detail later, this program utilizes a rules file containing macros for each process. The macros control the calling forth of appropriate software tools in an appropriate order and also control the gathering and transfer of information between various tools and between the system and various tools. The macros further control the performance of necessary interpretations/translations for transfers between tools and for transfers between tools and the system control software. In particular, Epic has the capability of encapsulting incompatible software tools so that all data transfers from the tool to Epic are reviewed and appropriate interpretation rules applied before the material being transferred is utilized by Epic and so that all outputs from Epic to the tool are also reviewed and necessary interpretations performed before material is returned to the tool. The encapsulation is completely transparent to both the software tool and the user.

Epic utilizes various additional programs which assist it in performing the interpretation and data collection functions. These programs include a program which is referred to as "GRM" which is an acronym for General Renaming Module. This program has various files, with there generally being at least one file for each pair of incompatible programs or software tools. Each GRM file includes a plurality of rules which may be utilized to perform translations for names from the originating language to a generated language. A file may also include a listing of translations for names in the original language to names in the generated language. For example, this might indicate that if an input is "A", the output should be "a". Such translation listings could be included in the file with the rules as originally provided or could be generated, using the rules, as translations are performed and saved as alias files for future use. GRM may also be utilized to perform translations between different hierarchy levels of a design from the same or different tools where the names used at such different levels is incompatible. Translation files would also be provided for each such hierarchy conversion.

A second program which may be used with Epic will sometimes be referred to as "RBI" which is an acronym for Rules Based Interface. This program is utilized to perform format translations where program tools do not have compatible formats. This, for example, may occur where one software tool is providing information in schematic form, while the other software tool is utilizing information in net list form (a list of the components in the circuit and the nodes or other components to which each such component is connected). A set of RBI rules files is provided for performing this function.

A third program which may be used with Epic is the dv (Design Verification) routine which is utilized to assist in collecting required information from the user or other sources for the various software tools being run on the system. Certain rules files are also provided for dv, the functions of which will be described later.

A fourth program which may be used with Epic is the Wavedit routine which is used to assist in the collecting, generating and processing of graphic inputs in general and of waveform data in particular. Various digital state definitions and logic rules are provided for use with this routine.

The various rule macros and rule files described above are initially stored on, for example, a hard or soft disk which may be inserted in, or is part of, store 28. Default rules files would typically be provided by the provider of the system. The macros and rules files are written in an interpretive extension language which is both human and machine readable. The macros and rules could be written in an existing extension language such as LISP, but are preferably written in a special language specifically adapted for this application. The macros and rules could all be written in the same language, or different interpretive extension languages could be used for various one or more of the files, so that an optimum language would be used in all instances. While examples of a suitable interpretive extension language are provided in some of the examples to follow, the particular language being utilized is not part of the invention.

It is important, however, that the various rules and macros be written in an interpretive extension language so that a person who will be referred to as a "tool integrator" working for the user can review the default rules and files provided with the system and can modify, add or subtract macros and rule files as required to conform the system to the needs of the user. Such changes can be made when the system is first received and can be made from time-to-time thereafter to reflect updates or enhancements to the system to correct errors which have been found in the operation of the system or to integrate new software tools into the system. The important thing is that only the tool integrator need be aware of changes. Once he has incorporated such changes into the rule macros and files, such changes are automatically performed by the system without the system operator needing to be aware of the changes or the fact that they have been entered. To the extent such changes require input from the operator, prompts can be provided to the operator to assure that he provides necessary inputs. If the operator doesn't understand a prompt, a menu item; or other aspect of system operation, a "help" function can be available to provide the operator with necessary information.

Thus, such changes are completely transparent to the operator and all he needs to be aware of is the process he desires to perform. By providing the macros and rules in the interpretive extension language, changes may be easily made to a file, may be verified by the tool integrator or other person making the changes, and may be immediately run on the system without requiring that the program be sent to a compiler to be compiled before being entered into the system to be run. This greatly simplifies the generating and verifying of the rule macros and files and reduces the time required for reconfigurations to be entered into the system. A system which is easily configurable and reconfigurable by the user/customer is thus provided.

Figure 2:
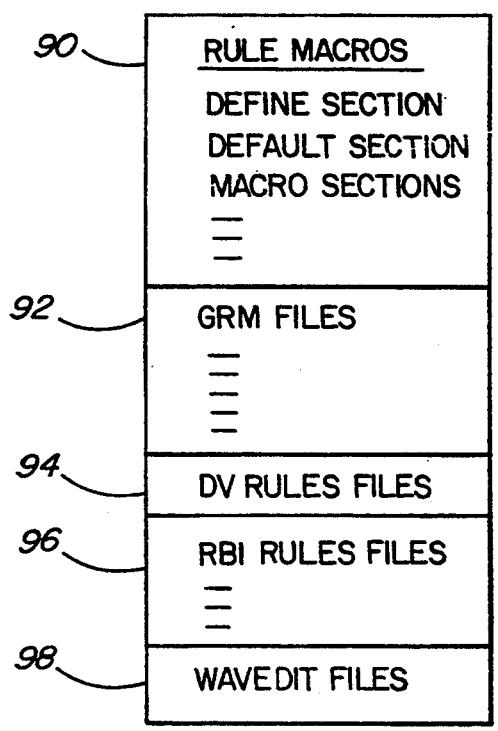
FIG. 2 is a diagram showing various files which may be stored in accordance with a preferred embodiment of the invention.

FIG. 2 illustrates a format in which the various rule macros and other files described above may be stored on a disk or other storage medium provided to the user for this system. The exact order in which the rules are stored is not critical, so long as suitable addresses or other means are provided for retrieving a particular macro or file when required.

Referring to FIGS. 6A-6B together, it is seen that, for purposes of illustration, the first thing stored in the disk is rules macro section 90, which section is used in conjunction with the main Epic program. This section starts with a header label which indicates this section as containing Epic rules. There are then a number of comments containing certain legal information, such as copyright notices, and comments to the user. The particular comment would advise the user's tool integrator that every software tool to be executed on the system must be listed in the definition section of the Epic rules file or it cannot be run.

The comments are followed by a definition section for the software tools. In this section, each software tool which is to run on the system is listed and various information is provided concerning this tool. Window, for example, indicates whether the software tool generates its own displays or whether it requires assistance from the operating system, in this case the Epic system, in order to generate displays. The default condition is that assistance is not required with "window" being indicated if assistance is required. The most important item from the standpoint of this invention is the "No Wrapper" indication. A program containing "No Wrapper" is one which is program compatible with Epic and, therefore, does not need to be encapsulted (interpretations are not required for transfers between the software tool and Epic). The default condition is "wrapper" which means that any software tool which does not contain the "No Wrapper" indication in the define section will be encapsulated. The other information provided in the define section would be default command line options for the tool.

The next two sections are the "initial sets" and are basically the default execution if something else is not indicated to be executed. In this case, the default execution is "Epicview" which is the program utilized to control displays for Epic. Epicview will cause a display such as that shown in FIG. 5 to appear on the screen in the default situation.

The remainder of the Epic rules are the macro section which contains a plurality of macros, generally one for each function to be performed on the system. Each macro includes an initial description in plain English of the function performed by the macro, primarily for the benefit of the user's tool integrator, and a set of rules or instructions which are to be executed in a predetermined order to perform the macro's function. As previously indicated, these are written in an interpretive extension language which is both human and machine readable. The particular macro shown in FIG. 6A is for a tool called "cadat" and performs a number of functions using routines which will be dicussed later. The first two get instructions set previously defined variables to the first and second parameters respectively entered into the macro. The next instruction indicates that if the variable "schedit_up" is set to "YES" (as a result of a previous operation, then one of two things can happen. If the variable "hi_type" had previously been set to a value "sim", then a first message involving the routine dv is sent to the tool "schedit", while if "hi_type" is not set to "sim" a different message involving the routine "Wavedit" is sent. If "schedit_up" is not set to "YES", the indicated message is sent back to the calling process of the macro.

The macro shown in FIG. 6B is a macro for the routine packager (pkgr) while a plain English description of the function of the routine is not provided in FIG. 6B, the macro would, in fact, normally contain such a description for use by the program integrator. Packager is an external tool which is incompatible in at least some ways with epic and, therefore, is to be encapsulated. As will be discussed later, such tools are refered to in the system "Whilexec" tools. The first three instructions in this macro, like those for the previous macro, involve setting certain previously defined variables to indicated values. The fourth instruction indicates that if the variable named "pkgr_file", one of the variables which was originally set, is empty, then an error message should be sent back to the calling process. Otherwise, a message is sent to the calling process that the tool pkgr is starting. The Whilexec indication says that this tool is to be encapsulated and, in particular, that while executing this tool, all outputs from pkgr will be interpreted by the following rules:

1. If the line of text returned from "pkgr" contains the word "error", then set a variable named "pkgr_status" to "errors".

2. If when the process "pkgr" completes, the process exits with an error status, then send a message to the calling process with error.

3. If the pkgr_status is o.k., then close the window that packager was run in and send a message to the calling process that all went well.

4. Otherwise, leave the window open and send a message indicating error.

As indicated previously, the exact language used in the macros is not critical and the examples have been provided merely to illustrate how macros can control the sequencing of operation and the encapsulation of an incompatible tool. For example, a manual entitled "Schematic Design Tools—Administrative Guide—Theda Revision 1.0", particularly in Section 3, describes particular language used for the macros in the preferred embodiment and provides further details on the operation of the preferred embodiment.

While only two macros are shown in FIG. 6A and 6B, there would typically be hundreds or even thousands of macros in a given system, the number of macros depending on the number of processes which the system may be called upon to perform.

Section 92 of the store contains GRM files for each translation which the system may be required to perform. A separate GRM file is required for a translation from tool A to tool B and for a translation from tool B to tool A. There may thus be two GRM files for each two language incompatible tools which are utilized in the system. Each GRM file contains a sequence of rules which may be utilized to perform translations for names between the two incompatible tools. A listing of at least selected names in the originating program along with the corresponding names in the output program may also be provided.

Section 94 of the store contains the dv rule files which are rule files for the entry of or translation of inputs to the system. These files, among other things, contain default inputs for each stage in each software tool where inputs are required. The default display caused by such rules may include an indication, where required, that certain information be provided by the user, and it may also provide an indication of additional optional information which the user may provide.

Section 96 contains rules files for the RBI program used by Epic. These are basically format translation rules for various software tools which are format incompatible. Typically, there would be a set of RBI rules, or in other words, an RBI rule file, for each pair of software tools which are format incompatible.

Section 98 contains files for use in the Wavedit routine. These files would include state definitions, logic rules, menu files and command source files for use by the Wavedit routine. The content and function of each of these files will be discussed later in conjunction with the Wavedit routine.

As previously indicated, all of the files indicated in FIG. 2 are written in an interpretive extension langauge, although it is not necessary that they all be written in the same interpretive extension language.

FIG. 4 is a flow diagram of the main Epic routine which is utilized to manage and control the operation of the system. When the user calls the Epic routine by a suitable input into processor 22, step 100, the first step, is to read the rule macros including the definitions and other information, from area 90 of storage 28 into a working store random access memory (RAM) in the processor (step 102). This will result in a process list being formed for each defined process, which list contains the macro for such task and also contains space in which a Whilexec task list and suspended task list for the given task or function may be stored. The reasons for the Whilexec and the suspended task list, the manner in which they are generated and their function will be described later. During step 106, a task list is formed which contains the macros which are previously read into the system. During step 108, a variable list is generated. This list is the database for all of the variables, such as the numerous variables discussed in conjunction with FIGS. 6A and 6B, which are used by Epic are stored. Thus, steps 104, 106 and 108 indicate the formation of the various lists. Either during step 102, 104, 106 or 108, or during step 110 during which other start up functions are performed, various syntax or other tests may be performed on the rules files read into the system to assure that they do not contain errors. While the files, particularly ones provided by the manufacturer, would normally be accurate, as is known in the art, there are a variety of ways in which errors can be introduced. It is, therefore, advisable, and is normal practice in the industry, to perform error checks before running a program.

Start up step 110 may also involve calling the default Epicview program which causes a display such as that shown in FIG. 5, including a menu 112 of icons, an exemplary set of which is shown on the right-hand of the screen in FIG. 5, to appear on the screen of display 30. The user may make selections from the menu 112 by, for example, moving a cursor to a selected icon by use of mouse 26. Each icon indicates a particular function which the system is adapted to perform. Selection of a given icon may result in the display of additional icons or in the display of some other type of menu from which the user may make a more detailed selection as to the function to be performed. However, for the preferred embodiment, the user makes selections of tasks at a fairly high level, and the system makes decisions concerning specific tasks to be performed to accomplish such function.

Once the start up functions required in connection with Epic have been completed, the operation proceeds to step 114 to wait for an input. So long as no input is received, the system remains in a hold status waiting for an input. When an input is received, the operation proceeds to step 116 to determine from what software tool or other source the input was received. For example, if the input was received by selecting an icon from the menu 112 of the display shown in FIG. 5, the input would come in through Epicview. The source from which an input is received is important, since this permits the Epic program to check the definitions section of its rules file (see FIG. 6A) to determine what, if any, actions are required with respect to inputs from this source. In particular, it will permit the system to determine if inputs from this source need to be encapsulated.

From step 116, the operation proceeds to step 118, to determine if the process is a terminating process. As will be discussed later, some processes may take a substantial period of time to complete, sometimes up to several hours, and it is preferable that the entire system not be tied up while such processes are being run. Such processes might, for example, be run on a piece of equipment other than processor 22. Therefore, when such a process is being run, the system has the option of storing the remaining queue of functions which need to be performed in connection with this process until the process has been completed. The remaining tasks to be performed are stored in the suspended task list portion of the process list for the particular process.

When the process has been completed, the software tool running the function provides an input to Epic which is recognized during step 118. This causes the operation to proceed to step 120 during which a determination is made as to whether anything was stored in the suspended task list for this particular process. If nothing was stored, then nothing further needs to be done on this process and the operation returns to step 114 to wait for the next input. If something is stored in the suspended task list for this process, the operation proceeds to step 122 to save material in the current execution queue. The current execution queue is stored in a predetermined location in the processor RAM. During step 124, the next step in the operation, the execution queue is loaded from the suspended task list for the process and the operation then proceeds to step 126 to look at the contents of the execution queue.

If during step 118 it is determined that the input is not from a terminting process, the operation proceeds to step 128 to read the input. A determination is made, either before or after step 128, as to whether the input is from a Whilexec process (step 130). As previously dicussed, a Whilexec process is a process which involves a software tool that is not language compatible with Epic and, therefore, requires that both inputs and outputs be interpreted before being outputted to the tool. Interpretation may involve translation and may also involve performing other operations which may be required for transfers to and from the incompatible tool to be valid. The definitions list of the Epic rules (FIG. 6) would indicate such software tool as being one which needs to be "wrapped", this being indicated for the preferred embodiment by not having the word "no wrapper" adjacent to the program name in the definition section. If it is determined that the program is a Whilexec program or process, the current execution queue is saved during step 132 and, during step 134 an execution queue which was previously stored, in a manner to be discussed later, in the Whilexec task list portion of the process list for the particular process is loaded into the main execution queue. This execution queue will contain interpretation rules for the receipt of material from the incompatible tool The operation then proceeds to look at the main execution queue during step 126.

If during step 130, it is determined that the input is not from a Whilexec process, the input, including all steps necessary for the performance of the particular inputted process, are loaded into the main execution queue during step 126. During this step, the queue is also looked at. All steps to be performed during the Epic operation are loaded into the main execution queue and are performed from this queue on a first-in-first-out basis. Thus, if this queue is empty, it means that there is nothing further to be performed by Epic. Therefore, the process makes a determination during step 136 as to whether the queue is empty. If the queue is empty, the operation proceeds to step 137 to determine if the execution queues were saved. Thus, if an execution queue was saved during, for example, step 122 or step 132, a "YES" output is obtained during step 137 which causes the operation to proceeds to step 139 to reload the saved execution queue into the main execution queue. The operation then returns to step 126 to check the main execution queue. If during step 137, it is determined that an execution queue was not saved, the operation returns to step 114 to wait for the next input.

If the queue is not empty, the operation proceeds to step 138 to determine if this input results in the calling of a macro. If during step 138, it is determined that this this input is a task or process which results in the calling of a macro, the operation proceeds to step 140 to save the current contents of the main execution queue and to load the macro for the given task or function during step 142 from the appropriate task list into the main execution queue. The operation would then proceed to look at the main execution queue. Since a macro was loaded into the queue, it would not be empty and it would not contain another task list input. Therefore, the operation would proceed to step 144, during which a determination is made as to whether the next item from the main execution queue is an internal command. If it is not an internal command, then the operation would give an appropriate error indication to the system and-/or the user during step 145 and would return to step 126 to look at the next item in the queue.

If during step 144 it is determined that the item currently being looked at from the main execution queue is an internal command, the operation proceeds to step 146 to perform the command. Performing a command during step 146 may result in the calling of another software tool to run on processor 22 or to run in another piece of equipment in the system. It may result in only a single operation being performed, or may result in multiple operations being performed. To the extent, during step 146, it is determined that an input to an incompatible (i.e. Whilexec) tool is required, Epic interpretation rules for effecting such transfer will appear in the Macro at the point where the transfer is being made or will be appropriately referenced. These interpretation rules will be applied to each transferred item from Epic to the tool so that all inputs to the tool are rendered in a manner transparent to both the tool and the user/operator.

As indicated above, in some instances the function being performed during step 146 may take several hours to complete. Thus, while step 146 is being performed, the operation also proceeds to step 148 to determine if the system wants to wait for a process output. This would occur when a Whilexec tool is being run, where there will be a need to receive an output from the tool when the execution is complete and interpretation of such output is required before it can function as a valid input to Epic. If there is a "yes" output during step 148, the operation proceeds to step 150 to move the execution queue to the process Whilexec task list in the progress list for the process and then returns to the main execution queue to perform other functions while waiting for an output from the Whilexec tool. When an output from the Whilexec tool is ready, it will be an input to the system and will come in through step 114. It will be recognized during step 130, causing the saved execution queue to be reloaded during step 134. As previously indicated, this saved execution queue will contain the interpretation rules required by the encapsulation of the tool to cause outputs from the tool to be valid inputs to Epic.

At the same time, a test is also performed during step 152 to determine if there is to be a wait for the process being executed to terminate. If there is to be a wait, then the execution queue is moved to the suspended task list in the progress files for the process being performed and the operation returns to the main execution queue. Since the main execution queue was emptied during step 154, during step 136, the queue will be found to be empty and the operation will return to step 114 to wait for a new input. When the process being performed ultimately terminates, an input is received by Epic which is detected during step 118, causing the stored suspended task list to be reloaded into the main execution queue during step 124.

If during step 152 it is determined that the system does not wish to wait for the process to terminate, the system returns to the main execution queue to look at the next step in the queue and to perform the step if possible. If the queue is empty at this time, the operation returns to step 114 to wait for the next input.

A rules based control system is thus provided which permits the management of tasks to be performed and controls the sequencing of the tasks. The system also controls both inputs from and outputs to language incompatible software tools by encapsulating such tools and performing necessary translations on inputs and outputs in a manner transparent to the user and the software tools. Epic is also capable of calling in the other software tools to be described hereinafter, as required, to perform various translation and data gathering functions as required.

A module which may be used in conjunction with Epic and called from various tools or routines as required is the general renaming module (GRM) which contains the main translation routines utilized by the system for transfers between tools which utilize different character strings (i.e. names) for a given item or other meaning (i.e. name incompatible tools). GRM may also be used where information is presented at a plurality of different hierarchy levels in a given tool or tools with different names being used for the same or corresponding items at the different levels. The term "name incompatible tools" will also sometimes refer to this condition. GRM involves several different routines which may be called by various application programs or by Epic as required when name translations are required or for other purposes to be discussed.

As previously indicated, GRM files are stored in area 92 containing a set of rules for performing translations between any two of the name incompatible software tools which may be utilized in the system. When an application is being run which may require a translation between an original name in one software tool, for example, another program sending data to the particular applications program, and a generated name in a second program receiving such data, for example, the applications program itself, the applications program requests that a "scope" be created which receives and stores the appropriate rules, and also provides space in which name translations generated using the rules in the scope may be stored for future reference.

FIG. 7 is a flow diagram of the steps involved in creating a scope for use in a particular translation. The process initiates from step 170 where a request for a scope is received from an applications software tool or from one of the other tools or routines forming part of this invention, such as, for example, RBI. When a request is received, a check is made to determine if the user rule file is new or, in other words, whether these rules have been previously used to create a scope (step 172). If the rules have previously been utilized to create a scope, then certain preliminary operations need not be performed and the operation proceeds to step 174 to get the rules, and then to step 176 to create a scope and store the rules in the scope. The scope is then stored in a selected location in the RAM of processor 22 and the applications program is informed of the address where the scope is stored (step 178).

If, as is usually the case, the rules have not previously been stored in a scope, the operation proceeds from step 172 to step 180 to perform various housekeeping functions required to open the new scope. The operation then proceeds to step 182 during which the rules from the file are read and, to the extent necessary, are converted to a form to be utilized by GRM or the applications program. For example, if the scope containing the rules is to be utilized by an applications program, some interpretation may be required to the rules so that they are compatible with such program. The rules as modified are then stored during step 184 and are put into the scope which has been established during step 176. The operation then proceeds to step 178 to store the scope and to provide information concerning the address where the scope is stored to appropriate software tools.

FIG. 8 is a flow diagram of a process which may be utilized to add user specific data to a scope or to retrieve such data from a scope. The environment in which the process of FIG. 8 might be utilized is where a particular type of information in the originating program, may be scattered throughout the program while such data is maintained as a block in the receiving program. It would be desirable if such data could be transferred as a block and the scope provides one means for accomplishing this objective. In particular, the system provider of an application tool for the system or possible the tool integrator of the user may determine that when a particular name is called, or when a particular scope is called, selected data should be transferred to the receiving tool with the given name or with the scope.

Referring to FIG. 8, during step 190, the party adding the data indicates that he wishes to add user specific data to a given name or scope for a given application tool. During step 192, a check is made to determine if the scope exists in the system. If the scope does not exist, this is an error condition and the party adding data is informed of this during step 194. Typically, this information would be provided by a suitable notation on a display such as display 30.

If the scope does exist, the operation proceeds to step 196 to determine if the material to be added is associated with a particular name. If the added material is to be associated with a particular name, it is added to the generated name, being stored with the name in the scope. While not indicated in FIG. 8, if the data is to be stored with a given name and the name does not exist, this may also be an error. If during step 196 it is determined that the added data need not be stored with a particular name, but should be stored with the scope and transferred to the receiving tool whenever the scope is accessed, then the operation proceeds to step 200 to add data to the scope. Under some circumstances, step 200 may also be performed in the event the name with which the data was to be stored does not exist in the scope.

When an applications program (tool) requests a given name or scope, step 202, the system checks to determine if the scope exists, step 204, and generates an error signal, step 194, if the scope does not exist. If the scope does exist, the operation proceeds to step 206 to determine if the request is for a name. If the request is for a specific name, the data previously stored with such name is retrieved and transferred under control of the applications program to an appropriate storage location for the applications program, along with any generated name for the original name, during step 208. If the request is for the scope and not for the specific name, the data stored during step 200 is retrieved during step 210 and transferred under control of the applications program to such program.

FIG. 9 illustrates the process which is followed when a name requiring translation is being transferred between two software tools. The process originates with step 220, indicating that a name translation is required. From step 220, the operation proceeds to step 222 to determine if the scope exists. If the scope does not exist, the operation returns to the "get scope" routine shown in FIG. 7 to generate a scope (step 224).

Either from step 222 if a "yes" output is obtained, or from step 224, the operation proceeds to step 226 to determine if the name is in the scope. This normally means that the name was previously generated and that the original and generated name have been stored in the scope for future reference. However, as previously indicated, such name translation list may be provided with the rules and originally stored in the scope. If the name is in the scope, the operation proceeds to step 228 to return the previously generated name, generally to the requesting applications program.

If the name is not in the scope, the operation proceeds to step 230 during which the originating name is put in the scope and is initially marked as "unique". From step 230, the operation proceeds to step 232 during which each of the rules in the file are checked in succession until all the rules are looked at. For each rule, the operation proceeds to step 234 to determine if the rule applies to the particular name. A rule might, for example, indicate that all upper case characters are to be converted to the corresponding lower case character. Thus, if the name is presented in upper case characters, the rule would apply, resulting in a "yes" output from step 234 and resulting in step 236 being performed. During step 236, the rule is applied to perform a conversion on the name. Either from step 234 if a "no" output is obtained or from step 236, the operation proceeds to step 238 during which the next rule is retrieved.

Rules 232, 234, 236 and 238 are performed in succession for each rule stored in the scope until, during step 232, it is determined that all rules in the scope have been performed. At this point, the translation of the name has been completed, except for various housekeeping functions which are performed during the following steps.

In particular, when all the rules have been applied, the operation proceeds from step 232 to step 240 during which the generated name is checked to see if it contains any characters which are invalid in the receiving tool. To the extent any such characters are found, they are removed. The operation then proceeds to step 242 to determine if the length of the generated name exceeds a maximum length defined by the user for names in the receiving program. If the length of the generated name exceeds the maximum, the name is truncated using appropriate truncating rules. Normally, this would be accomplished by merely removing the excess number of characters from the end of the name. However, more complex truncating rules may be applied, such as removing vowels as a first cut. Finally, during step 244, any required prefixes or suffixes defined by the user may be added to the name. If step 244 is performed, a root may be truncated during step 242 so that the final name does not exceed the maximum length.

During step 246, a determination is made as to whether there is to be a one-to-one mapping between original names and generated names. If a one-to-one mapping is not required, then the designation for the name which was provided during step 230 is changed from "unique" to "non-unique" during step 248. While the name generated may, in fact, be unique, the name is marked as non-unique during step 248 so that, if the generated name appears later, and the latter generation is also permitted to be non-unique, the system will permit such use. If the system thinks that the original generation is unique, it would not permit such later generation of the same generated name.

What has just been said is illustrated by step 249, the next step in the operation. During step 249, a determination is made as to whether the generated name collides with a unique name previously generated and contained in the names list. If the name does not collide with a unique name, the operation proceeds to step 250 during which the generated name is stored with the original name in the scope. The newly-generated name is then returned to the applications program which originally made the request during step 252. If during step 249 it is determined that the name does collide with a unique name, the operation proceeds to step 256 to determine if the name can be modified to be unique. The operations which are performed during and after step 256 are described in the following paragraphs.

If during step 246 it is determined that a one-to-one mapping is required, then, during step 254, a determination is made as to whether the generated name is unique. If the generated name is unique, then the name is remembered during step 250 and returned during step 252.

If the generated name is not unique, then the operation proceeds to step 256 to determine if the name can be modified in a manner defined by the user, and in particular by rules generated by the tool integrator of the user, or by rules provided by the provider of the system, to be unique. Such modification might involve adding predetermined additional characters to the beginning or end, preferably the end, of the name so as to render it unique. For example, the numbers 0 to 9 may be added in succession at the end of non-unique names in order to render such names unique. If it is not possible to render the name unique, then translation of this name is not possible. This is an error condition, step 258, and a suitable indication of this error is provided to the user, normally on display 30.

If it is possible to modify the name to be unique, such modification is made during step 260 to provide a name which is unique and is also valid in the receiving tool. From step 260, the operation proceeds to step 250 to remember the generated name and to return the generated name to the requesting tool. A generalized rules based translating mechanism is thus provided which is highly flexible and may be easily modified to accommodate any changes in the system.

There are situations where a tool utilizing a generated name may wish to determine what the originating name was for such generated name or where a system operator may desire such information. FIG. 10 is a flow diagram of a routine for providing this facility.

Referring to FIG. 10, when a request for an original name is generated, step 270, the operation proceeds to step 272 to determine if the generated name is in the appropriate scope. If the generated name is not in the appropriate scope, meaning for example that no request was made for translation which resulted in the generated name, then the request cannot be fulfilled and an error indication is provided to the requesting tool, and may also be provided to the user during step 274.

If the generated name is in the scope, the routine finds the original name for such generated name during step 276. During step 278, a determination is made as to whether the original name for the generated name is unique (i.e. whether the given generated name is a generated name for more than one original name). If the original name is unique, the original name is returned to the requesting source during step 280. If the original name is not unique, then a list of all original names pointing to the generated name is returned during step 282.

Since the same two programs may be communicating on many occasions, it is desirable that, once a listing of original and generated names has been produced for a given scope, this listing be saved so that it may be available for use in a subsequent scope for the same two tools. FIG. 11A is a flow diagram of a routine for saving the names list generated for a given scope as a name file, and FIG. 11B is a flow diagram of a routine for reading such stored name file into a new scope provided for transfers between the same software tools. Referring to FIG. 11A, the routine requires that for each name in the original scope, step 290, an output be generated which is formatted in a manner specified by the user, or in a default format specified by the system provider, and that this output be written to a selected file for storage (step 292). When all of the names in the scope have been outputted, the operation proceeds from step 290 to step 294 to return to the previous program being run. The file generated as a result of FIG. 11A is sometimes referred to as an alias file.

Referring to FIG. 11B, when a request is made to read an alias file previously stored, the first step is step 300 during which each record (i.e. each name) in the file is retrieved. The retrieved record is broken into pieces of predetermined size, or otherwise processed in a manner instructed by the user or the system, during step 302. The processed name is then added to the new scope during step 304. Steps 300, 302 and 304 are repeated until all records in the alias file have been stored in the scope, at which time the operation branches from step 300 to step 306, causing the operation to return to the originating tool.

In addition to the requirement to translate name inconsistencies between software tools, there are also situations where the format between two programs are incompatible and must be modified to be compatible. For example, one tool may be presenting information in a graphic, schematic diagram form such as, for example, that shown in FIG. 14. Another program may wish to utilize the same data in a net list form where components and nodes are defined, and an indication is provided for each component as to the nodes and/or other components which it is connected between. The system of this invention provides a routine, which is referred to as the Rules Based Interface (RBI) routine which accomplishes such transformations and may also be utilized for performing standard transformations, to the extent necessary, between, for example, incompatible instructions for performing the same function in the two languages. FIG. 12 is a flow diagram of the RBI routine.

Referring to FIG. 12, the operation is started by the RBI routine being called by Epic or by some other program running on the system, or as the result of a user input. This is indicated as the start step 310 in FIG. 12.

The first step in the operation, step 312, is to read and store various options at an appropriate location in the RAM used to store information for the RBI routine. Options, schematics, waveforms and the like will sometimes be hereinafter referred to as "objects", objects being elements which are either provided by the system provider or user (options) or from another program (schematic components, waveforms, etc.) on which the rules for conversion provided by RBI are applied.

During step 314, the next step in the operation, the appropriate RBI rule file or files stored in area 96 of store 28 is read into an appropriate section of the processor memory. During step 316, a check is made on the rules to make sure that they are using correct characters in correct places and are valid in the context of the RBI routine. The rules should be valid, but it is always possible that an error may develop for a variety of reasons, and it is, therefore, advisable to perform a semantic check before using the rules.

During step 318, the next step in the operation, the requested data base which is to be converted is read into the system and any external required information necessary to perform the conversion is also read. For example, a GRM scope generated in the manner previously indicated may be provided for use by the RBI program.

Once these preliminary operations have been completed, the program proceeds to step 320 to begin processing rules, starting with the first or top data base object and the first rule. As previously indicated, the data base objects are the schematic characters, waveforms, net list entries, or options entered by the user or others on which conversion is required. From step 320, the operation proceeds to step 322 where the next rule, in this case, the first rule, is moved to a "Current Rule" register. During step 324, a check is made as to whether the current rule register is empty. If the current rule register is empty, this means that all of the rules have been looked at and the process is complete. This causes the operation to branch to step 326 to print out the result of the RBI operation or any portion thereof, or other material which the routine is requested to print out. Alternatively, this material may merely be stored, for example in an appropriate location in store 28, without being printed. Once step 326 is complete, the system exits from the RBI routine through step 328, informing Epic or another program which had requested the running of RBI and/or the user that this operation has been completed.

If during step 324 it is determined that the current rule register is not empty, as would be the case when the first rule has been loaded therein, the operation proceeds from step 324 to step 330 to determine if this is a "scope" rule. There are basically two types of rules in the RBI routine which are referred to as "scope rules" and "terminating rules". A terminating rule generally involves a single instruction which may be executed immediately. By contrast, a scope rule generally involves two or more instructions and may also involve branching or other factors. Any rule which is not a "scope rule" is a "terminating rule". Thus, if during step 330 it is determined that the rule is not a scope rule, then the operation proceeds to step 332 to execute the single instruction of the terminating rule and then returns to step 322 to load the next rule in the queue into the current rules register.

If during step 330 it is determined that the rule in the current rule register is a "scope" rule, then the operation proceeds to one of a number of different steps, depending on the type of scope rule which was received. There are basically five types of scope rules which may be received. Two of the type of scope rules relate to the beginning and end, respectively, of a four sequence. These are illustrated in FIG. 12A by the "for all [nets]" instruction or rule and the "for all [symbols]" rule which follows it. Later on, there is also a "four_bar all [ports]" rule. These rules indicate that for all of the objects indicated in the brackets, the following rules are to be applied and an end for all rule is indicated by the thin_for_all bracket ports instruction and by the similar finish instruction for [symbols] and [nets] shown in FIG. 12A. These are the rules which end a for_all sequence.

Two other types of instructions arise from an if sequence, two of which are shown in FIG. 12A. Each if sequence starts with the word "if" followed by the object on which the if is to be performed which is in brackets. One or more rules then follows and the if sequence is terminated or ended by the fin__if rule which also includes the object.

The final type of rule is a scope breaking rule. This is a rule which tests to see if a particular condition has been met and, if the condition has been met, bypasses the remaining instructions of the scope; or, in other words, prevents the remainder of the rule from being performed. A break rule is not specifically indicated in FIG. 12A.

Referring to FIG. 12, if it is determined from step 330 that the scope rule is a beginning for scope rule, the operation proceeds to step 334 to get the next object of the type specified in the for rule. For example, with the for__all__nets instruction, during step 334 the next "nets" would be retrieved during step 334. From step 334, the operation proceeds to step 336 to determine if all of the objects of the type specified have been looked at. If all of the objects have not been looked at, then the next rule inside the for scope is obtained during step 338 and this rule is loaded into the current rules when the operation returns to step 322. During the next cycle, the object is looked at by this rule and acted on by the rule. When the fin__for__all is reached during step 338 for a given object, this rule is recognized during step 340 and causes the next object of the type specified in the last "for" rule to be retrieved. A determination is then made as to whether the object is empty and the for scope rules are applied to the new object if it is not empty by cycling through the appropriate steps and executing in the terminating and scope rules. Once step 336 is entered from step 340 and it is determined that the object is empty, the operation proceeds to step 342 to go to the end of the for scope rule, thus exiting from this rule.

Similarly, if the incoming scope rule during step 330 is recognized as a beginning if scope rule, the operation proceeds to step 344 to determine if the if condition is true. If the if condition is not true, the operation goes to step 346 which causes the operation to execute the first rule following the end of the if scope and the operation returns to step 322 to place this rule as the next rule in the current rule register.

If the if condition is true, the operation proceeds to step 348 to get the rule inside the if scope and to place this rule as the next rule in the current rule register. The operation then returns to step 322 to cause this rule to be executed. When the rule inside the if scope is the terminate if scope rule, the operation proceeds to step 350 from step 330 to get the next rule outside of the if scope and to place this rule as the next rule in the current rule register, and the operation then returns to step 322 to cause the execution of such rule.

Finally, if during step 330 it is determined that the rule is a scope breaking rule, the operation proceeds to step 352 to determine if the break condition is true. If the break condition is true, then the operation goes to the end of the scope, or in other words gets the first rule outside of the scope, during step 354 and this rule becomes the next rule in the current rules register. The operation then returns to step 322. Similarly, if there is a no output during step 352, the next rule is retrieved during step 356, is loaded as the next rule in the current rules register, and the operation returns to step 322 to execute this rule.

As indicated above, the RBI rules control conversions of format between the two programs being looked at so that objects in one of the tools are converted to the appropriate format for the other tool. The rules may also be utilized on objects which are standard instructions or other items in one of the tools which need to be converted to operate on the other tool.

Another requirement for a system which is to control the operation of a large number of software tools is the capability to interactively gather information required by such tools at each stage in their operation. Such information may be gathered from the system user or operator or from other tools on the system. Where the information is gathered from the operator, it is preferable that the operator be required to provide as little information as possible, default inputs being available for most of the required inputs, and that the user be prompted to provide all required inputs. The user may also be prompted as to optional inputs available at that stage. Preferably, the system should not proceed with the indicated operation unless the user has provided all required inputs and such inputs are valid.

The routine which provides the functions described above for control and other non-graphic inputs and possibly for certain types of graphic inputs is referred to as the design verification or dv routine. FIG. 13 is a flow diagram of this routine and FIG. 14 is an illustrative display obtained using this routine.

Referring to FIG. 13, the program is entered through start step 360 from Epic or another appropriate software tool running on the system. dv can be called whenever there is a need for the interactive entry of data or other appropriate material into the system.

The next step in the operation, step 362, is to read graphic and menu information for dv which is stored in an appropriate place in area 95 of store 28 and to display the basic dv icon display. The dv icons are shown in area 364 in FIG. 14 and this portion of the display shown in FIG. 14 would be what initially appears on the screen of display 30.

The system then reads the Epic rules appropriate to this task from area 90 of store 28 and stores these rules as an understood task list, the function of which will be described later (step 366). During step 368, the next step in the operation, the system reads the dv rules from area 94 of store 28, or at least the portion of such rules relevant to the software tool or tools currently being run, and stores these rules as a task command list. These rules define special commands for the particular tool and contain, among other things, default inputs for various stages in the tool. An exemplary section of a dv rules file is shown in FIG. 13A.

The system then reads the schematic design files during step 370. These are files containing information concerning the schematic being looked at including, for example, an explanation as to the meaning of each box in a schematic. The schematic design files are also stored at an appropriate location in the RAM of processor 22.

To the extent a similar task may have been performed previously, and any information generated during such previous running was saved for future reference, such information is also retrieved and written in the processor RAM during step 372. Thus, when steps 362-372 have been completed, the system has accumulated a large volume of information and rules which may be required in order to perform the dv function. It should be noted that while the information is retrieved and stored in a particular order in FIG. 13, this order is for purposes of illustration only, and the information may be retrieved and stored in any desired order.

The next step in the operation is step 374 during which a channel is opened to communicate with Epic. This is a bidirectional channel. If this channel cannot be opened, the program will shut down.

Once the preliminary functions described above have been completed, the operation proceeds to step 376 to wait for an input. Nothing further happens until a "yes" output is obtained during step 376, indicating that an input has been received. When an input is received, the operation proceeds to step 378 to determine if the input is a "quit" input. If the input is a quit input, indicating that dv is to be exited, the operation proceeds to step 380 to determine if the user wants to save the environment. Step 380 provides the capability of either storing selected tasks or rules as modified by the user or saving any other material specified by the system integrator in the rules or macros, by the system operator or by the system vendor in the material provided with the system. If information is to be saved, the operation proceeds to step 382 to save the indicated information. From step 380 if a "no" output is obtained or from step 382, the operation proceeds to step 384 to quit or leave the dv routine. The environment material stored during step 382 would be the material stored during step 372 the next time the tool is run.

If a "no" output is obtained during step 378, as would normally be the case, the operation proceeds to step 386 to determine if the input is one which is to be performed by Epic (i.e. the program shown in FIG. 4) rather than by dv. This is determined by use of the Epic rules stored during step 366. If the program is one which is to be performed by Epic, the task is sent to Epic (step 388) through the channel established during step 374. From step 388, the system returns to step 376 to wait for a new input.

If the task is not one to be performed by Epic, then the operation proceeds to step 390 to determine if the task is a dv command. If the task is neither a dv nor an Epic command, then there is an error which is indicated to the system and/or the user in a suitable manner during step 392. From step 392 the operation returns to step 376 to wait for a new input. The new input may, for example, be an input from the user correcting the error.

If the command is a dv command, the operation proceeds to step 394 to determine the type of dv command that has been received. There are three basic types of dv command which are generally indicated as "information gathering", "translation", and "design reading". Assume initially that during step 394 it is determined that the command is the design reading command. Under this condition, the operation proceeds to step 396 to read and store the specific schematic diagram which has been generated at that point in the operation of the tool, for example the schematic diagram shown on the screen in FIG. 14, and to also read and store the GRM aliasing information for such tool and a tool to which the schematic is to be transferred, or the GRM aliasing information between the schematic at its hierarchy level and a higher or lower hierarchy level to which it is desired to convert the schematic. The information stored during step 396 is utilized by later commands to perform the desired conversion. From step 396, the operation returns to step 376 to wait for a new input.

If it is determined that the input is a translation command, this means that a translation is to be performed for a particular schematic element or component or on some other element or component displayed to the user. During step 398, the user is prompted to indicate the component or other element on which the operation is to be performed. Once the user completes this operation, during step 400, in response to the user input, dv accesses the database stored during steps 396 or 370 to translate the designated item. During step 402, the translated item is sent to Epic if appropriate through the channel opened during step 374. Some translated items are stored only in dv or may be otherwise routed as indicated by dv rules or elsewhere. Once step 402 has been completed, the operation returns to step 376 to wait for a new input.

If it is determined that the dv command is an information gathing command, the operation proceeds from step 394 to step 404 during which the user is shown on the screen of display 30 a default task command setup which may contain the following three elements:

1. A listing of default inputs appropriate for the given stage in the operation of the software tool. These would be provided by the user's system integrator or by the provider of the system.

2. An indication of inputs which it is required that the user provide. These might, for example, be specific values for components such as resistance or capacitance values.

3. Optional inputs which may be provided by the user at this stage in the operation of the software tool, but which the system can proceed without. This might, for example, be an indication of manufacturer for a component or of color coding for wires which could be entered at this point in the design, but which may not be required.

The user may accept any or all of the default inputs or may change them, must add required inputs for the operation to proceed and may add any of the optional inputs. During step 406, a determination is made as to whether the user has made any changes. If the user has made changes, the operation proceeds to step 408 to incorporate the changes into the internal environment, namely, to record the changes at the appropriate place in memory. From step 406, if there is a "no changes" output or from step 408, the operation proceeds to step 410 to determine if all required changes have been made. If all required changes have not been made, the operation goes to step 412 during which the user is prompted to make required changes. This would include entering required inputs at the places indicated. The prompting may be done in any suitable manner such as, for example, by flashing or otherwise highlighting a required change or input which has not been made. From step 412, the operation returns to step 406 to see if the user has made changes and through steps 408 and 410 to determine if all required changes have now been made.

When all required changes have been made, the operation proceeds to step 414 to determine the appropriate Epic task, for example the task selected by the user. This Epic task is then sent to Epic during step 402 if appropriate along with information gathered by dv through the channel established during step 374 and the operation returns to step 376 to wait for the next input.

The dv program described above is adapted to collect alphanumeric and other control information from a user. However, when doing electronic design, and particularly when running simulation programs in conjunction with such designs, it is frequently necessary to enter selected graphic data, and in particular analog or digital waveforms, into the system. As for dv, it is desirable that the user be prompted to provide such graphic data as required, that default inputs be available to the user in most situations, and that the overall operation be as simple and foolproof for the operator as possible. It is also important that the routine be adapted to operate with software tools from a variety of different sources which may present waveforms in different languages, use different names and/or use different formats and that translations or interpretations be provided by the system in a manner which is transparent both to the user and to the simulator or other software tool for which information is being gathered. The operator should have the option of either selecting preexisting waveforms or other graphics or drawing his own waveform on the screen of display 30 using, for example, mouse 26.

The routine of this invention which provides the various capabilities indicated above is referred to as "Wavedit". While the discussion with espect to "Wavedit" is with respect to waveform inputs, it is apparent that the techniques described could also be utilized for other types of graphic inputs. A flow diagram of the Wavedit routine is shown in FIG. 15 and flow diagrams of various subroutines of this routine are shown in FIGS. 16-19.

Referring first to FIG. 15, the routine is entered through step 420. The routine may be entered in response to an input from Epic, from one of the other routines or software tools being run on the system, such as for example a simulator requiring graphic inputs, or in response to a suitable input from the operator. Typically, Wavedit might be entered in response to a command from a macro of the Epic routine which is being run to perform a simulation function.

Once Wavedit is entered, the first step, step 422, is to initialize internal data. This is done automatically in response to commands which form part of the Wavedit routine and results in reading necessary data into the system from the Wavedit files 98 to cause a default initial display to be generated, including a default waveform or waveforms and a default menu. The default display may be overridden, as will be discussed later, by user inputs.

During step 424, the next step in the operation, various configuration files are read into the system. FIG. 16 is a more detailed flow diagram of the operations performed in connection with step 424. Referring to FIG. 16, the first step, step 426, is to open a state definition file. The state definition file provides values to be displayed for each digital state which may appear in a digital waveform to be generated. As a minimum, two digital states, 0 and 1, would be defined. However, various rising and falling states, as well as other digitally defined states known in the art, may be utilized in the system. Each state which is to be used in conjunction with a particular running of the Wavedit routine must be defined during step 424. Typically, there will be default definitions for at least the binary 0 and binary 1 states. Additional default definitions may be provided. These will be available when a state definition file is opened during step 426 and will be read into the system during steps 428 and 430. Each definition in the state definition file indicates what the state looks like when drawing, how the system identifies the state and how the system is to convey information concerning the state. The user may either accept the default definitions or enter definitions of his own in a suitable manner.

During step 428, a determination is made as to whether all the definitions for the particular running of the Wavedit routine have been entered and during step 430, an additional definition is read into the table if all definitions have not yet been read. Steps 428 and 430 are repeated until all definitions required for the particular running of the routine have been entered.

When all state definitions have been entered, the operation proceeds to step 432. During step 432, a determination is made as to whether all of the state logic rules from area 98 of memory have been read into the RAM of processor 22. State logic rules are, for example, rules for performing Boolian algebra or other rules which define potential interactions between waveforms. If during step 432 it is determined that all of the state logic rules have not been read, the operation proceeds to step 434 to read additional logic rules into an internal logic rule table in an appropriate Wavedit area of a RAM of processor 22. Steps 432 and 434 are repeated until it is determined that all of the logic state rules have been read, at which time the operation proceeds to step 436 to close the definition files.

The operation then proceeds to step 438 to open a filter list file. The filter list file contains information permitting Wavedit to receive inputs from or to transfer its outputs to software tools, generally simulator tools, which may be language or format incompatible with Wavedit. In particular, the filter list file indicates a software tool which may be utilized to effect appropriate translations between Wavedit and the external tool. Such translation routine might be RBI, or might be some other translation tool available in the system. Once a filter list has been opened in an appropriate area in processor 22 RAM, the operation performs steps 440 and 442 to determine if there are more filter specifications to be read from area 98, or from another appropriate location, into the filter list file and to read the filter specifications into the internal filter list file until all filter specifications have been read into this file. When this occurs, the filter file is closed during step 444.

From step 444, the operation proceeds to step 446 to read menu files into an appropriate area in the processor RAM area for Wavedit. These are various menus which may appear on the screen of display 30 during the running of the Wavedit routine. The menus would typically be menus of icons. The read menu file step would typically also involve opening the file, determining if there are more menus to read, reading the menus and closing the file the same as for the prior two files, but for purposes of simplying the diagram, this operation has been shown as only a single step in FIG. 16.

Similarly, the read command source file step 448 has also been shown as only a single step, even though it would also involve four separate steps. The command source file defines macros for use in running Wavedit. These macros, like the ones for Epic, contain a sequence of steps to perform a particular function and are written in an interpretive extension language.

When step 448 has been completed, the read configuration files step is finished and the operation proceeds to step 450 (FIG. 15), to determine if there are any data files to read. This step generally determines whether the user has provided a waveform definition which he wishes to have displayed. If the user has not defined a display, the operation proceeds to step 452 to set up the system for editing with no file. This means that when a display is generated under these conditions, the display will be a display of the default waveforms and menus which were inputted during step 422.

If the user has provided input, the operation proceeds from step 450 to step 454 to determine if the file entered by the user requires filtering. Filtering would be required when the input is received from a third party program rather than from, for example, a preexisting Wavedit file and is not name or format compatible with Wavedit. If filtering is needed, the operation proceeds to step 456 to call for the appropriate filter or interpretation/translation tool as indicated from the filter list file stored during steps 438-444 to perform necessary translations or other interpretations on the input.

Either from step 454 if a no output is obtained or from step 456, the operation proceeds to step 458 to determine if a Wavedit file exists. This step basically is seeking to determine whether a file was actually created during the interpretation performed during step 456 or from the input received. If a file was created, the file is read and stored during step 460. If a file was not created, an empty file is created during step 462. This file may be added to later when inputs are received.

From step 460 or step 462, the operation proceeds to step 464 to determine if there are more files to read. If there are more files to read, the operation returns to step 454 to determine if such files need filtering.

If there are no more files to read during step 464, or if step 452 is performed, the operation proceeds to step 466. Step 466 causes certain operations to be performed to initialize the system for the display of waveforms. The operation then proceeds to step 468 to draw the waveforms. FIG. 18 is a more detailed flow diagram of the steps involved in draw display step 468.

Referring to FIG. 18, the first step in this operation, step 470, is to determine whether there are more waveforms to draw in a view. At this point, it should be mentioned that a Wavedit display contains a hierarchy of displays. At the highest level of the hierarchy is the graphic screen on which everything is drawn. On the single graphic screen, there may be one or more views, each view having axis and containing one or more waveforms or traces. Thus, step 470 is initially inquiring as to whether there are waveforms to be drawn in the initial view.

If there are waveforms to be drawn in an initial view, the operation proceeds to step 472 to perform the necessary operations to draw the required axis for the view and waveform and to place necessary labels on the view for the waveform.

Once step 472 has been completed, the operation proceeds to step 474 to determine if the waveform is digital. If the waveform is not digital, the operation proceeds to step 476 to draw the analog waveform utilizing a suitable waveform generating routine which does not form part of the present invention by use of the X-Y number information provided for the analog waveform.

If it is determined that the waveform is a digital waveform, the operation proceeds to step 478 to determine if there are more states in the waveform which need to be displayed. If there are more states in the waveform which need to be displayed, the operation proceeds to step 480 to draw the particular digital state using the appropriate state definition from the state definition table generated during steps 426-430. The operation then returns to step 478 to determine if there are more states to be drawn and loops through steps 478 and 480 to generate the desired waveform until, during step 478, it is determined that all states in the waveform have been drawn.

When the drawing of a particular waveform has been completed, the operation returns to step 470 to determine if there are more waveforms to draw in the particular view. If there are more waveforms to be drawn in the view, the operation proceeds to step 472 to add axis and/or labels to the view for the new waveform, if necessary, and through steps 474-480 to draw the waveform. When during step 470 it is determined that there are no more waveforms to be drawn for the particular view, the operation branches to step 482 to determine if there are more views which are to appear in this graphic screen. If there are more views to appear on the graphic screen, the operation returns to step 470 to determine if there are waveforms for the new view and, if there are, to proceed through steps 472-480 to draw labels and axis for such waveform and to draw the waveform. This sequence of operations will continue until all waveforms for an additional view have been drawn, at which time the operation returns to step 482 to determine if there are more views to be drawn. When all views have been drawn, a no output is obtained during step 482, resulting in the operation exiting from the draw display step 468.

When the operation exits the draw display step 468, it proceeds to step 486 to wait for an input. When an input is received during step 486, the operation proceeds to step 488 to determine if the input was received from the keyboard (a user input) or from Epic (socket). If the input was received as a keyboard input from the user, or from Epic, the operation proceeds to step 490 to find the command requested by the input. A command can be found either in the macros entered during step 448 or in internal commands stored as part of the Wavedit routine, with commands first being looked for in a macro, and then in the internal commands. If a command is found, step 492, the operation proceeds to step 494 to execute the command.

FIG. 17 is a more detailed flow diagram of the command execution step 494 for an exemplary command, in this case an evaluation command. The evaluation command may, for example, result in the forming of a third waveform from a combination of two other waveforms. When during step 496, it is determined that an evaluation command has been received for particular waveforms, the operation proceeds to step 498 to determine if the waveforms are digital. If the waveforms are not digital, the operation proceeds to step 500 to combine the waveforms using standard mathematical functions, for example, variance or covariance, and using existing software tools which are not specifically a part of this invention.

If the waveforms are determined to be digital, the operation proceeds to step 502 to determine if all digital states of the waveforms which are to be combined have been combined. If there are more digital states to be combined, the operation proceeds to step 504 to combine the corresponding states of the two waveforms, using the appropriate logic rules from the logic rules table which was stored during steps 432 and 434 (FIG. 16). Such combination may involve a single step or multiple steps, depending on the complexity of the combining logic. From step 504, the operation returns to step 502 to determine if there are more digital states to be combined, and the operation loops through states 502 and 504 until all of the digital states of the two waveforms to be combined have, in fact, been combined.

When the combining of the two waveforms has been completed, either as a result of an analog combination using step 500, or as the result of a digital combination through steps 502 and 504, the operation proceeds to step 506 to create a new waveform from the output of the combined waveforms and to step 508 to add the new waveform to the display. The waveform would be added to the display utilizing the same steps shown in FIG. 18 for initially adding a waveform to the display, with appropriate inputs being received as to the view in which the waveform should appear.

Once step 508 has been completed, the command is done and the operation returns to step 510 to determine if the command was executed correctly. If during step 492 a command was not found, an error message would be printed during step 512 and the operation would also proceed to step 510 to determine if the command had been properly executed If the command is not properly executed, as would be the case if this step were entered through step 512, the operation does not look for anymore keyboard or Epic entries, but goes to step 514 to determine if there is a mouse input. The reason for this is that commands may be interrelated and if one command was not executed properly, this may prevent subsequent commands from being executed properly. These commands are therefore, not performed, and the user is provided with an appropriate error message indicating that the command did not execute properly.

If the command did execute properly, then the operation proceeds to step 516 to determine if there are more keyboard or socket inputs. If there are such additional inputs, the operation returns to step 490 to find and execute such commands. When during step 516 it is determined that there are no more keyboard or socket (Epic) inputs, the operation also proceeds to step 514 to determine if there is a mouse input.

When during step 514 it is determined that there is a mouse input, the operation proceeds to step 518 to find the area on the display where the mouse is located. In this situation, the mouse would typically be over some area of a waveform being displayed on the screen. The mouse may have several buttons on it, for example three buttons, with each button representing a different command which may be executed for the area over which the mouse is located. During step 520, the next step in the operation, the command to be executed as a result of the button operated on the mouse is determined and the command is executed. Such a command might be, for example, to place a point on the waveform to permit measurements to be made at the point and recorded. Measurements can also be made in response to a command between the indicated point and a previously indicated point.

If there is no mouse input during step 514, or after the completion of step 520, the operation proceeds to step 522 to determine if there is a menu command input. A menu command input is obtained when, for example, the mouse is over an icon on a menu being displayed and an appropriate button is operated. If a menu command input is present, the operation proceeds to step 524 to find the command, either in the stored macros or in the internal command set of Wavedit, and to step 526 to execute the command. The command would be executed in much the same way as the command was executed during step 494 as illustrated for an exemplary command in FIG. 17.

If no menu input is found during step 522, or when the execution of a command is completed during step 526, the operation returns to step 486 to wait for an additional input. The operations described are repeated for additional inputs until, as a result of either a keyboard or Epic input or a menu input, a quit command is located.

FIG. 19 illustrates the sequence of operations which occurs when this command is located. Referring to FIG. 19, when a quit command is located during step 530, the operation proceeds to step 532 to determine whether all altered data has been saved. If all altered data has not been saved, then the operation proceeds to step 534 to prompt the user that use altered data has not been saved and to request the user verify it is acceptable to exit the Wavedit routine which would result in the loss of such altered data. If the user indicates that it is not acceptable to quit with all altered data not being saved, then the operation branches to step 536 to exit the quit command, returning to Wavedit to permit the altered data to be saved. If a "yes" output is obtained during either step 532 or step 534, the operation proceeds to exit the Wavedit routine, completing the operation.

A system has thus been provided which substantially simplifies the use of automated design systems and automated manufacturing systems while providing a high level of configurability to meet special requirements of a given user and to meet changes in such requirements as they arise. The system permits the use of tools which are language, name and/or format incompatible in a manner which is fully transparent to both the user and the software tools, all through the use of a single integrated system.

While the invention has been shown and described above with respect to a preferred embodiment, it is to be understood that the embodiment is for purposes of illustration only and that numerous changes in the various steps indicated and in the order of such steps could be made, and that other changes in form and detail could be made by one skilled in the art while still remaining within the spirit and scope of the invention.

What is claimed is:

1. A system for integrating and managing the operations of a plurality of different software tools, the system comprising:
   means for storing a plurality of rule macros, each corresponding to a particular process;
   means for inputting a process to the system;
   means responsive to the inputted process for retrieving the corresponding macro;
   execution means, responsive to the retrieved corresponding macro, for causing one or more selected tools to be executed in a predetermined sequence as determined by the corresponding rule macro, the macros each including rules for executing one receiving inputs and for providing outputs in response to the inputs, wherein each tool is individually operable to perform a desired function and is operable as part of a process with other software tools, wherein at least some of the tools receive inputs and/or provide outputs which are incompatible with the system;
   means for determining whether one of the selected tools being executed is incompatible with the system based on a list of software tools; and
   encapsulation means, responsive to the execution of an incompatible tool and to interpretation rules, for causing all transfers from and to the incompatible tool to be automatically checked and interpreted as necessary.

2. A system as claimed in claim 1 wherein the list of software tools to be utilized in the system is stored in said means for storing, an indication being provided in the list for each tool as to whether the tool is an incompatible tool.

3. A system as claimed in claim 1 wherein a plurality of interpretation rules are at a predetermined location in a macro corresponding to an incompatible tool, the encapsulation means including:
means for checking each transfer from and to the incompatible tool for an input/output to which one of the interpretation rules applies, and
means responsive to the transfer of an input/output to which an interpretation rule applies for performing the interpretation set forth in the interpretation rule.

4. A system as claimed in claim 3 wherein said interpretation rules include separate rules for items transferred from the incompatible tool and for items transferred to the incompatible tool, and wherein said means for checking and said means for performing check and perform, respectively, with respect to the appropriate rules for the directions in which an item is being transferred.

5. A system as claimed in claim 4 including
means, operative when an incompatible tool is being executed, for determining if the interpretation rules for transfer from the incompatible tool should be stored,
means for storing the interpretation rules which the determining means determines should be stored, and
means, responsive to an output from said tool, for returning said interpretation rules and for utilizing said interpretation rules to interpret outputs from the incompatible tool.

6. A system as claimed in claim 2 wherein said rule macros, including said interpretation rules, are written in an interpretive extension language which is both human and machine readable.

7. A system as claimed in claim 6 wherein at least some of said macros contain rules for a plurality of software tools to perform a given function, the rules specifying the order in which the tools are executed.

8. A system as claimed in claim 7 wherein at least one of said macros contains a rule which causes the retrieval of a new macro from said means for storing.

9. A system for integrating and managing the operations of a plurality of different software tools, at least some of which are incompatible with the system, a format for at least one of said tools being different from a format for another tool, and wherein transfer can occur in at least one direction between said one and said another tool, the system comprising:
means for storing a plurality of rule macros, each relating to a particular function;
means for inputting a process to the system;
means responsive to an inputted process for retrieving a corresponding macro;
means responsive to the retrieved macro for causing selected tools to be executed in a predetermined sequence, wherein a macro includes rules for controlling the sequencing of tools and the interfacing of tools with the system, with a user, and with each other, wherein a software tool is a program for receiving inputs and for providing outputs in response to the inputs, wherein each tool is individually operable to perform a desired function and is operable as part of a process with other software tools, wherein at least some of the tools receive inputs and/or provide outputs which are incompatible with the system as determined by a list of software tool;
a rules file containing format conversion rules for tools having incompatible formats;
means, operative when there is to be a transfer between format incompatible tools, for retrieving the appropriate format conversion rules from the rules file; and
means for utilizing the retrieved rules to control format conversion of material to be transferred between the format incompatible tools.

10. A system as claimed in claim 9 wherein one or more of the tools includes a nested hierarchy of material on a component with different names being utilized for the same item at different levels in the hierarchy; and
including a rules file for translations of said names for the various hierarchy levels, and means for utilizing said rules file to obtain the appropriate name for an item at a given hierarchy level.

11. A system as claimed in claim 9 wherein at least two format incompatible tools are also name incompatible;
the system further including means for performing required name translations on transfers between said name incompatible tools.

12. A system for integrating a number of software tools, wherein a software tool is a program for receiving inputs and for providing outputs in response to the inputs, wherein each tool is individually operable to perform a desired function and is operable as part of a process with other software tools, wherein at least some of said tools provide outputs which are name incompatible with other tools so that means of outputs for one tool are not compatible as inputs to another tool, said system comprising:
means for storing a plurality of rule macros, each relating to a particular process;
means for inputting a process to the system;
means responsive to an inputted process for retrieving a corresponding macro;
means responsive to the retrieved macro for causing selected tools to be executed in a predetermined sequence, wherein a macro includes rules for controlling the sequencing of tools and the interfacing of tools with the system, with a user, and with each other, wherein a software tool is a program for receiving inputs and for providing outputs in response to the inputs, wherein each tool is individually operable to perform a desired function and is operable as part of a process with other software tools, wherein at least some of the tools receive inputs and/or provide outputs which are incompatible with the system as determined by a list of software tools;
a rules file including translation rules for tools which are name incompatible; and
means operative when there is a transfer of names between name incompatible tools for utilizing appropriate rules in the rules file to effect translations necessary to render said tools compatible.

13. A system as claimed in claim 12 including means for storing with each rules file a list of name translations for the name incompatible tools.

14. A system as claimed in claim 13 wherein said rules and corresponding name list are stored in a scope, a name translation entry being added to the list each time a translation is made for a name not already on the list.

15. A system as claimed in claim 14 further including: means, responsive to the transfer of a name requiring translation between said name incompatible tools, for determining if there is an entry for the name requiring translation in the names list,
- means, responsive to a determination that there is an entry for the name requiring translation, for utilizing the entry to translate the name, and
- means, responsive to a determination that there is no entry for the name requiring translation, for utilizing the appropriate rules to translate the name requiring translation.

16. A system as claimed in claim 15 wherein said means for utilizing the appropriate rules includes means for looking at each appropriate rule to determine if it is applicable to the name, and means for applying appropriate rules to perform the translation of the name.

17. A system as claimed in claim 16 including means for removing any invalid characters after a name translation by said means for applying appropriate rules.

18. A system as claimed in claim 16 including means for truncating a translated name to an appropriate maximum length.

19. A system as claimed in claim 16 including means for adding any required prefixes or suffixes to a translated name.

20. A system as claimed in claim 16 including means for determining if a unique translated name is required for each name to be translated, means operative if a unique translated name is required for determining if the translated name is unique, means operative if the translated name is not unique for determining if the translated name can be modified to be unique, and means for modifying the translated name to be unique if such modification is possible.

21. A system as claimed in claim 20 including means for indicating for each entry in said name list whether such entry is for 1 translated name which is required to be unique.

22. A system as claimed in claim 14 including means for storing the name list of a scope as an alias file.

23. A system as claimed in claim 14 including means for utilizing the names list in a scope to provide original names from generated names, wherein if there is not a unique original name, said means to provide provides a list of original names for each generated name applied thereto.

24. A method as claimed in claim 14 including the steps of storing the name list of a scope as an alias file.

25. A system for integrating a number of software tools, wherein a software tool is a program for receiving inputs and for providing outputs in response to the inputs, wherein each tool is individually operable to perform a desired function and is operable as part of a process with other software tools, said system comprising:
- means for storing a plurality of rule macros, each relating to a particular process;
- means for inputting a process to the system;
- means responsive to an inputted process for retrieving a corresponding macro;
- means responsive to the retrieved macro for causing selected tools to be executed in a predetermined sequence, wherein a macro includes rules for controlling the sequencing of tools and the interfacing of tools with the system, with a user, and with each other, wherein input information is required from a user for at least some tools, wherein a software tool is a program for receiving inputs and for providing outputs in response to the inputs, wherein each tool is individually operable to perform a desired function and is operable as part of a process with other software tools, wherein at least some of the tools receive inputs and/or provide outputs which are incompatible with the system as determined by a list of software tools;
- rules files; and
- means for utilizing the rules files to actively enter required input information.

26. A system as claimed in claim 25 wherein said rules files provide default inputs for each stage at which inputs are required of each tool, and including means operative when a tool is at a stage where inputs are required for displaying the default inputs for such stage to the user, means for permitting the user to make changes to the default inputs, and means for communicating the default inputs as modified by the user to the tool.

27. A system as claimed in claim 26 including means for permitting the user to indicate that the user wishes to make inputs to a tool or to the system.

28. A system as claimed in claim 26 including means for prompting the user in the default input display as to items which the user must add as inputs at the given stage in the tool.

29. A system as claimed in claim 28 including means for inhibiting further operation of the tool until the user makes the required inputs.

30. A system as claimed in claim 28 including means for prompting the user in the default input display as to optional items which the user may add as inputs at the given stage in the tool.

31. A system as claimed in claim 25 including means for storing information concerning a design and for storing translation information concerning a selected one or more tools;
- means for prompting a user to select an element of the stored design on which a selected translations is to be performed; and
- means responsive to a user input for effecting the selected translation on the element selected by the user.

32. A system as claimed in claim 25 wherein said required input information is digital graphic information; and
- including means for storing state definitions for valid digital states for the graphic information;
- means for receiving graphic information to be inputted; and
- means for utilizing the stored state definitions to display said received graphic information.

33. A system as claimed in claim 32 wherein the received graphic informations may be either default graphic information from the system or graphic information provided by a user.

34. A system as claimed in claim 32 wherein said means for storing rules files includes means for storing logic rules for operating on said graphic information;
- means for receiving and recognizing commands for operating on said graphic information; and
- means for utilizing appropriate stored logic rules to execute a received and recognized command.

35. A system as claimed in claim 32 wherein said digital graphic information includes waveforms; and wherein said means to display utilizes the stored state definitions to control the display for each successive state of a waveform to be displayed.

36. A method for integrating and managing the operations of a plurality of different software tools, said method comprising the computer implemented steps of:
   storing a plurality of rule macros, each corresponding to a particular process;
   inputting a process to the system;
   retrieving a corresponding macro in response to the inputted process;
   executing one or more selected tools in a predetermined sequence in response to the retrieved corresponding macro, the macros each including rules for executing one or more tools, wherein a software tool is a program for receiving inputs and for providing outputs in response to the inputs, wherein each tool is individually operable to perform a desired function and is operable as part of a process with other software tools, wherein at least some of the tools receive inputs and/or provide outputs which are incompatible with the system;
   determining if one of said selected tools being executed is incompatible with the system based on a list of software tools; and
   encapsulating the tool, causing all transfers from and to the tool to be checked and to be interpreted as necessary in accordance with interpretation rules in response to a determination that the selected tool being executed is incompatible.

37. A method as claimed in claim 36 wherein the list of software tools to be utilized in the system is stored with said macros, an indication being provided for each tool in the list whether the tool is an incompatible tool.

38. A method as claimed in claim 36 wherein said encapsulation step includes the steps of:
   checking the interpretation rules at a predetermined location in a macro for a software tool requiring encapsulation during each transfer from and to the tool for an item to which one of the interpretation rules applies, and
   performing the interpretation set forth in the interpretation rule in response to the transfer of the item to which the interpretation rule applies.

39. A method as claimed in claim 38 including the steps, operative when an incompatible tool is being executed, of
   determining if the interpretation rules for transfer from the tool should be stored,
   storing the interpretation rules in response to a determination that the interpretation rules should be stored,
   returning said stored interpretation rules in response to an output from said incompatible tool, and
   utilizing said returned interpretation rules to interpret outputs from said incompatible tool.

40. A method as claimed in claim 37 wherein said rule macros, including said interpretation rules, are written in an language which is both human and machine readable.

41. A method as claimed in claim 40 wherein a macro may contain rules for a plurality of software tools to perform a given function, the rules specifying the order in which the tools are performed.

42. A method as claimed in claim 41 wherein at least one of said macros contains a rule which causes the retrieval of a new macro from said means for storing.

43. A method for integrating and managing the operations of a plurality of different software tools, at least some of which are incompatible with the system, said method comprising the computer implemented steps of:
   storing a plurality of rule macros, each relating to a particular function;
   inputting a process to the system;
   retrieving a corresponding macro in response to an inputted process; and
   executing selected tools to be executed in a predetermined sequence in response to the retrieved macro, wherein a software tool is a program for receiving inputs and for providing outputs in response to the inputs, wherein each tool is individually operable to perform a desired function and is operable as part of a process with other software tools, wherein at least some of the tools receive inputs and/or provide outputs which are incompatible with the system;
   wherein a macro can include rules for controlling the sequencing of tools and the interfacing of tools with the system, with a user, and with each other through interpretation rules for translating outputs of one tool to another form for use as inputs to another tool which is incompatible as determined by a list of software tools.

44. A method as claimed in claim 43 wherein the format for at least one of said tools is different from the format for another tool, and wherein transfer may occur in at least one direction between said one and said other tool, said method further including:
   providing a rules file having format conversion rules for tools having incompatible formats;
   returning the appropriate format conversion rules from the rules file when there is to be a transfer between format incompatible tools; and
   utilizing the retrieved format conversion rules to control format conversion of material to be transferred between the format incompatible tools.

45. A method as claimed in claim 44 wherein at least two format incompatible tools are also name incompatible; and including the steps of performing required name translations on material transferred between said name incompatible tools.

46. A method as claimed in claim 43 wherein at least some of said tools are name incompatible said method further including:
   providing a rules file containing translation rules for tools which are name incompatible; and
   utilizing appropriate rules in the rules file to effect translations necessary to render said tools compatible when there is a transfer between name incompatible tools.

47. A method as claimed in claim 46 including the step of storing, with each rules file, a list of name translations for the name incompatible tools.

48. A method as claimed in claim 47 further comprising:
   storing said rules and corresponding name list in a scope, and
   adding a name translation entry to the list each time a translation is made for a name not already on the list.

49. A method as claimed in claim 48 including the steps of:

determining, when there is a transfer of a name requiring translation between said name incompatible tools, whether there is an entry for a name requiring translation in the names list, utilizing the entry to translate the name in response to a determination that there is an entry for the name requiring translation in the names list, and utilizing the appropriate rules to translate the name in response to a determination that there is no entry for the name requiring translation in the names list.

50. A method as claimed in claim 49 wherein said utilizing step includes the steps of checking each appropriate rule to determine if it is applicable to the name, and applying appropriate rules to perform the translation of the name.

51. A method as claimed in claim 50 including the steps of removing any invalid characters after a name translation during said applying appropriate rules step.

52. A method as claimed in claim 50 including the steps of truncating a translated name to an appropriate maximum length.

53. A method as claimed in claim 50 including the step of adding any required prefixes or suffixes to a translated name.

54. A method as claimed in claim 50 including the steps of determining if a unique translated name is required for each name to be translated, if a unique translated name is required, determining if the translated name is unique, if the translated name is not unique, determining if the translated name can be modified to be unique, and modifying the translated name to be unique if such modification is possible.

55. A method as claimed in claim 54 including the step of indicating, for each entry in said name list whether each entry is for a translated name which is required to be unique.

56. A system as claimed in claim 48 including the step of:

utilizing the names list in a scope to provide original names from generated names, so that if there is not a unique original name, said providing step includes providing a list of original names for each generated name applied thereto.

57. A method as claimed in claim 43 wherein one or more of the tools includes a nested hierarchy of material on a component with different names being utilized for the same item at different levels in the hierarchy.

58. A method as claimed in claim 43 wherein input information is required from a user for at least some tools, said method further including:

providing a rules files written in an interpretive extension language; and utilizing the rules files to interactively enter required input information.

59. A method as claimed in 58 including the steps of:

storing information concerning a design;

storing translation information concerning a selected one or more tools;

prompting a user to select an element of the stored design on which a selected translation is to be performed; and effecting, in response to a user input, the selected translation on the element selected by the user.

60. A method as claimed in claim 58 wherein said rules files provide default inputs for each stage at which inputs are required of each tool; and including the steps of:

displaying the default inputs for each stage to the user when a tool is at a stage where inputs are required, permitting the user to make changes to the default inputs, and communicating the default inputs as modified by the user to the tool.

61. A method as claimed in claim 60 including the step of permitting the user to indicate that the user wishes to make inputs to a tool or to the system.

62. A method as claimed in claim 60 including the step of prompting the user in the default input display as to items which the user must add as inputs at the given stage in the tool.

63. A method as claimed in claim 62 including the step of inhibiting further operation of the tool until the user makes the required inputs.

64. A method as claimed in claim 62 including the step of prompting the user in the default input display as to optional items which the user may add as inputs at the given stage in the tool.

65. A method as claimed in claim 58 wherein said required input information is digital graphic information; and including the steps of storing state definitions for valid digital states for the graphic information;

receiving graphic informations to be inputted; and utilizing the stored state definitions to display said received graphic information.

66. A method as claimed in claim 65 wherein the received graphic informations may be either default graphic information from the system or graphic information provided by a user.

67. A method as claimed in claim 65 including the steps of storing logic rules for operating on said graphic information;

receiving and recognizing commands for operating on said graphic information; and utilizing appropriate stored logic rules to execute a received and recognized command.

68. A method as claimed in claim 65 wherein said digital graphic information includes waveforms; and wherein the stored state definitions are utilized to control the display for each successive state of a waveform to be displayed.

* * * * *